(12) United States Patent
Gutmann et al.

(10) Patent No.: US 8,289,321 B2
(45) Date of Patent: Oct. 16, 2012

(54) METHOD AND APPARATUS FOR DETECTING PLANE, AND ROBOT APPARATUS HAVING APPARATUS FOR DETECTING PLANE

(75) Inventors: Steffen Gutmann, Tokyo (JP); Masaki Fukuchi, Kanagawa (JP); Kohtaro Sabe, Tokyo (JP); Kenta Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1222 days.

(21) Appl. No.: 10/593,150

(22) PCT Filed: Mar. 17, 2005

(86) PCT No.: PCT/JP2005/004839
§ 371 (c)(1),
(2), (4) Date: Jul. 2, 2007

(87) PCT Pub. No.: WO2005/088244
PCT Pub. Date: Sep. 22, 2005

(65) Prior Publication Data
US 2007/0257910 A1 Nov. 8, 2007

(30) Foreign Application Priority Data

Mar. 17, 2004 (JP) ................ P2004-077215

(51) Int. Cl.
*G06T 15/30* (2011.01)
(52) U.S. Cl. ........................ 345/423; 345/419
(58) Field of Classification Search .................. 345/423, 345/419
See application file for complete search history.

(56) References Cited

U.S. PATENT DOCUMENTS 5,378,969 A 1/1995 Haikawa
(Continued)

FOREIGN PATENT DOCUMENTS

JP 05-223549 8/1993
(Continued)

OTHER PUBLICATIONS

Xiaoyi Jiang et al., Fast Segmentation of Range Images Into Planar Regions by Scan Line Grouping:, Machine Vision and Applications, 1994, vol. 7, No. 2, pp. 115 to 122.
(Continued)

*Primary Examiner* — Maurice L McDowell, Jr.
(74) *Attorney, Agent, or Firm* — Finnegan, Henderson, Farabow, Garrett & Dunner, L.L.P.

(57) ABSTRACT

In a plane detection apparatus, a plane detection unit (3) includes a line fitting block (4) to select a group of distance data points being in one plane from distance data forming an image and extract lines from the distance data point group, and a region growing block (5) to detect one or more planar regions existing in the image from a group of all lines included in the image and extracted by the line fitting block (4). The line fitting block (4) first draws a line D1 connecting end points of the distance data point group, searches a point of interest brk whose distance to the line L1 is largest, segments the data point group by the point of interest brk when the distance is larger than a predetermined threshold, and determines a line L2 by the least-squares method when the distance is smaller than the predetermined threshold. In case there exists a larger number of data points than a predetermine number on one side of the line L2, the data point group is determined to be in a zig-zag shape, the data point group is segmented by the point of interest brk. These operations are done repeatedly. Thus, a plurality of planes robust against noises is detected simultaneously and accurately from distance data including measurement noises.

21 Claims, 34 Drawing Sheets

U.S. PATENT DOCUMENTS

| | | | |
|---|---|---|---|
| 5,402,050 | A | 3/1995 | Ozawa |
| 5,546,476 | A | 8/1996 | |
| 5,737,217 | A | 4/1998 | Nishikawa et al. |
| 5,978,504 | A * | 11/1999 | Leger ............................ 382/153 |
| 6,021,363 | A | 2/2000 | Nishikawa et al. |
| 2004/0013295 | A1 | 1/2004 | Sabe et al. |
| 2004/0138780 | A1 * | 7/2004 | Lewis ........................... 700/245 |
| 2005/0131581 | A1 | 6/2005 | Sabe et al. |
| 2005/0135680 | A1 * | 6/2005 | Kanade et al. ................ 382/203 |

FOREIGN PATENT DOCUMENTS

| | | |
|---|---|---|
| JP | 07-93541 | 4/1995 |
| JP | 07-093541 | 4/1997 |
| JP | 2001-062566 | 3/2001 |
| JP | 2001-62566 | 3/2001 |
| JP | 3176701 | 4/2001 |
| JP | 3278467 | 2/2002 |
| JP | 3330710 | 7/2002 |
| WO | WO 2005/087452 A1 | 9/2005 |

OTHER PUBLICATIONS

J. Sklansky; "Measuring Concavity on a Rectangular Mosaic", IEEE Trans. Comput. 21, 1972, pp. 1355-1364.

A. Melkman; "On-Line Construction of the Convex Hull of a Simple Polygon", Information Processing Letters 25; 1987; pp. 11-12.

U.S. Appl. No. 10/593,149, filed Sep. 18, 2006, National Stage of International Publication No. WO 2005/087452.

A. Hoover et al.; "An Experimental Comparison of Range Image Segmentation Algorithms"; Transaction on Pattern Analysis Machine Intelligence. Jul. 1996.

L. Iocchi et al.; "Visually Realistic Mapping of Planar Environment with Stereo", Int. Symposium on Experimental Robotics (ISER), 2000.

K. Okada et al.; "Plane Segment Finder: Algorithm, Implementation, and Applications"; Int. Conf. on Robotics and Automation (ICRA); 2001.

X. Y. Jiang et al..; "Fast Segmentation of Range Images into Planar Regions by Scan Line Grouping"; Machine Vision and Applications; 7(2); 1994.

A.W. Fitzgibbon et al.; "Lack-of-Fit Detection Using the Run-distribution Test"; ECCV (2) 1994.

* cited by examiner

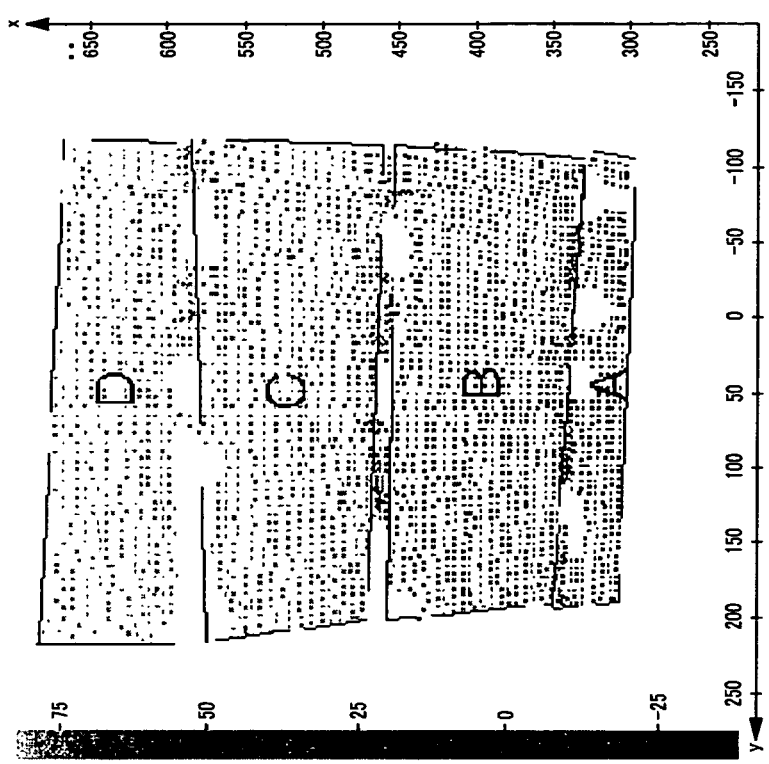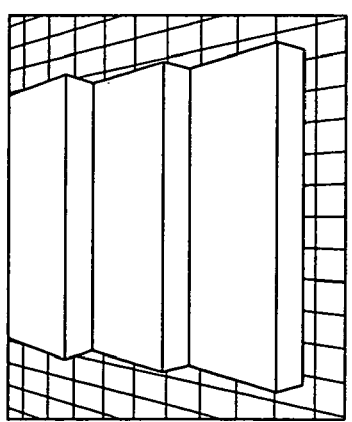
FIG. 1

4cm × 30cm × 10cm/21cm

3cm × 33cm × 12cm/32cm

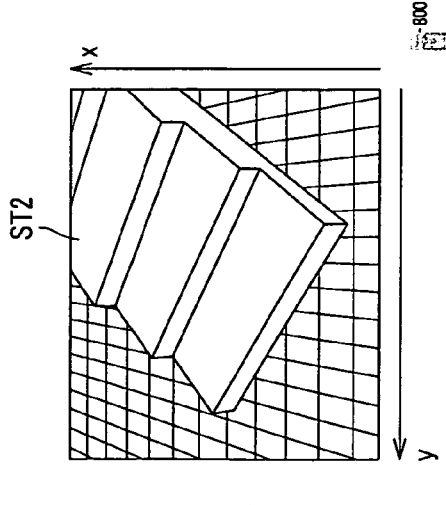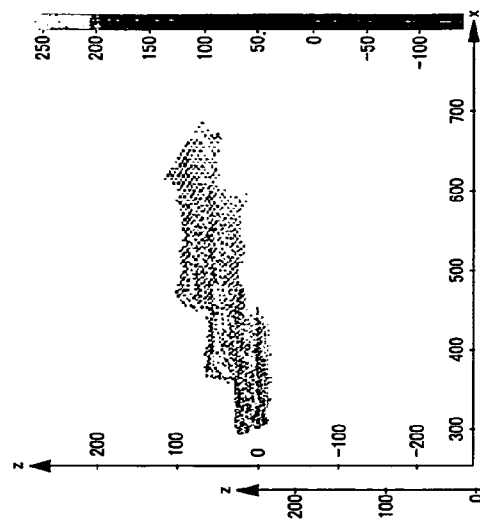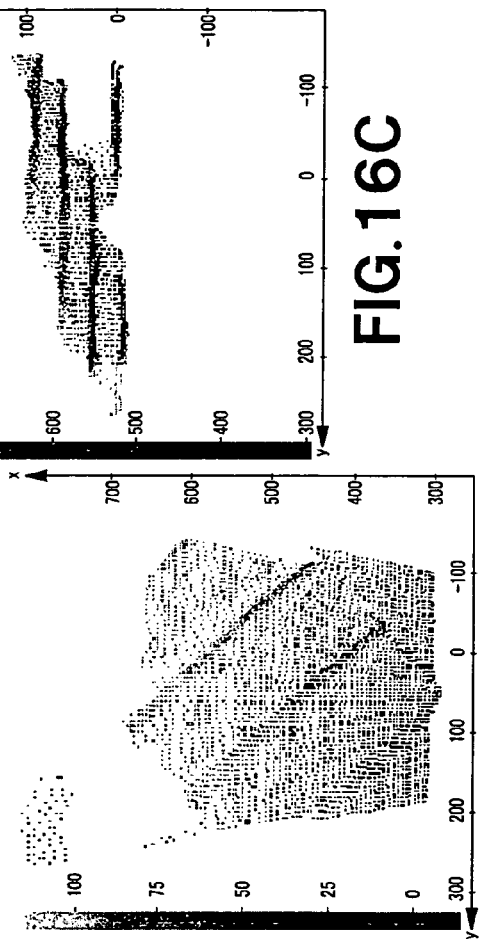
FIG.16A
FIG.16B
FIG.16C
FIG.16D

Input: *pts* : vector of points, *n* : number of points, $\alpha, d, \sigma$ : parameters and std-dev of fitted line.
Output : true if curve contains a *zig-zag-* shape, false otherwise.
Sequence :

if $\sigma$ > *thresh$\sigma$* then
    *val0* = *pts*[0].*x*\* cos $\alpha$ + *pts*[0].*y*\* sin $\alpha$ + *d*
    *count* = 1
      for *i* = *1 to (n-1)* do
          *val* = *pts*[*i*].*x*\* cos $\alpha$ + *pts*[*i*].*y*\* sin $\alpha$ + *d*
          if (*val\* val0* <=0) then
              *val0* = *val*
              *count* = 1
          else
              *count* = *count* + 1
              if (*count* >= *min-points-for-zig-zag-shape* ) then
                  return true
              endif
          endif
      endfor
    endif
    return false

FIG.23

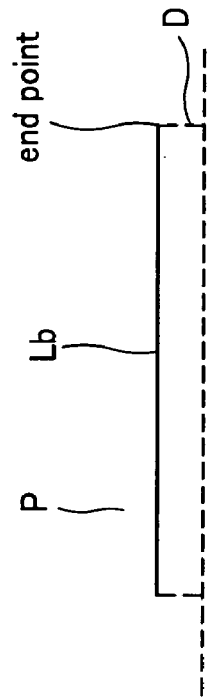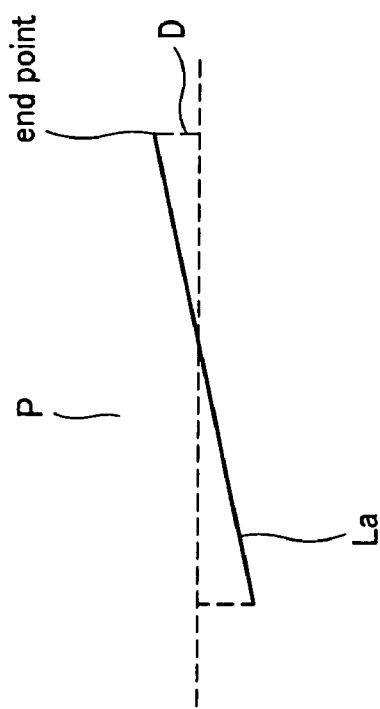
FIG.27B
FIG.27A

Algorithm *FindSeedRegion*

Input: *lines[i]*: vector of lines for esch image row (or column) $i$, n: number of image rows (or columns)

Output : set of lines (seed region) or empty set (no seed found).

Sequence :

for $i = 0$ to $(n-3)$ do for $l_1$ in *lines[i]* do for $l_2$ in *lines[i+1]* do for $l_3$ in *lines[i+2]* do if *overlap*$(l_1, l_2)$ and *overlap*$(l_2, l_3)$ then $(n,d) = $ fitPlane$(l_1, l_2, l_3)$ if *rms*$(l_1, l_2, l_3) < thresh1_{rms}$ then seed = $\{l_1, l_2, l_3\}$

*remove*$(l_1, l_2, l_3)$ return *seed* endif endif endfor endfor endfor endfor return *{}*

FIG.28

Algorithm *RegionGrowing*

Input: *region* : set of lines as seed region,

*lines[i]* : vector of lines for esch image row (or column) $i$, $n$: number of image rows (or columns)

Sequence :

$A = 0, b = 0$ for *l in region* do *(A,b) = add(A,b,l)* endfor $(n,d) = solve(A,b)$

*open = region* while *not empty(open)* do $l_1$ = *select(open), open = open - {$l_1$}* for *i in neighbor(index($l_1$))* do for $l_2$ *in lines[i]* do if *overlap($l_1$, $l_2$)* and *rms($l_2$) < thresh2$_{rms}$* then

*region = region + {$l_2$}*,

*(A,b) = add(A,b,$l_2$), (n,d) = solve(A,b)*

*open = open + {$l_2$}*,

*remove($l_2$)* endif endfor endfor endfor

*plane = {n,d,A,b,region}*

*planes = planes + {plane}*

FIG.29

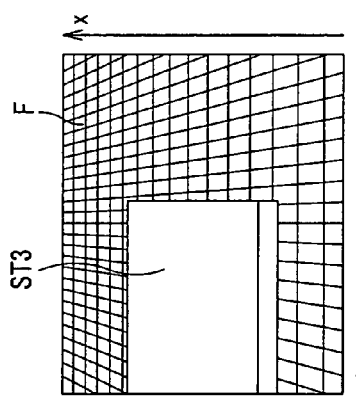
FIG.31A
| No | max_d | enable zig-zag | correct extraction (horizontal) | correct extraction (vertical) |
|----|-------|----------------|----------------------------------|-------------------------------|
| 1  | 30    | no             | 0 / 10                           | 0 / 10                        |
| 2  | 25    | no             | 0 / 10                           | 0 / 10                        |
| 3  | 20    | no             | 10 / 10                          | 0 / 10                        |
| 4  | 15    | no             | 10 / 10                          | 3 / 10                        |
| 5  | 10    | no             | 10 / 10                          | 10 / 10                       |
| 6  | 30    | yes            | 10 / 10                          | 10 / 10                       |
FIG.31B
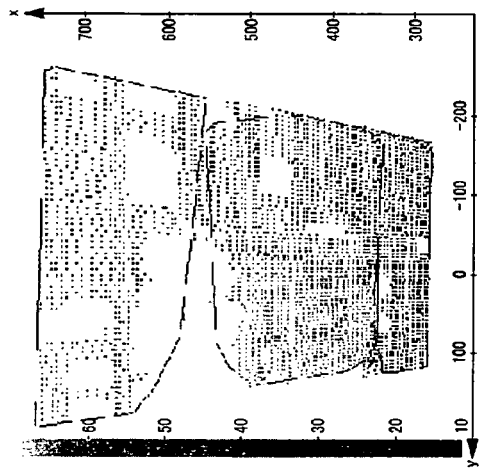
FIG.31D
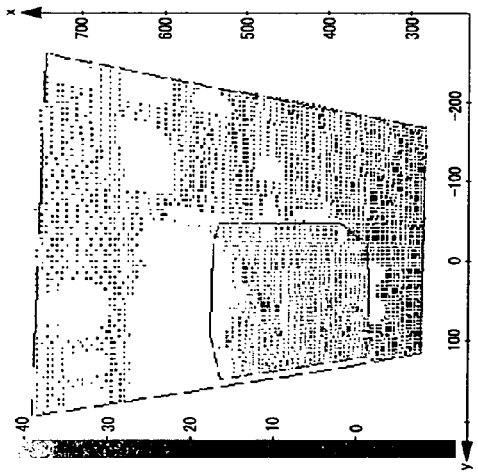
FIG.31C

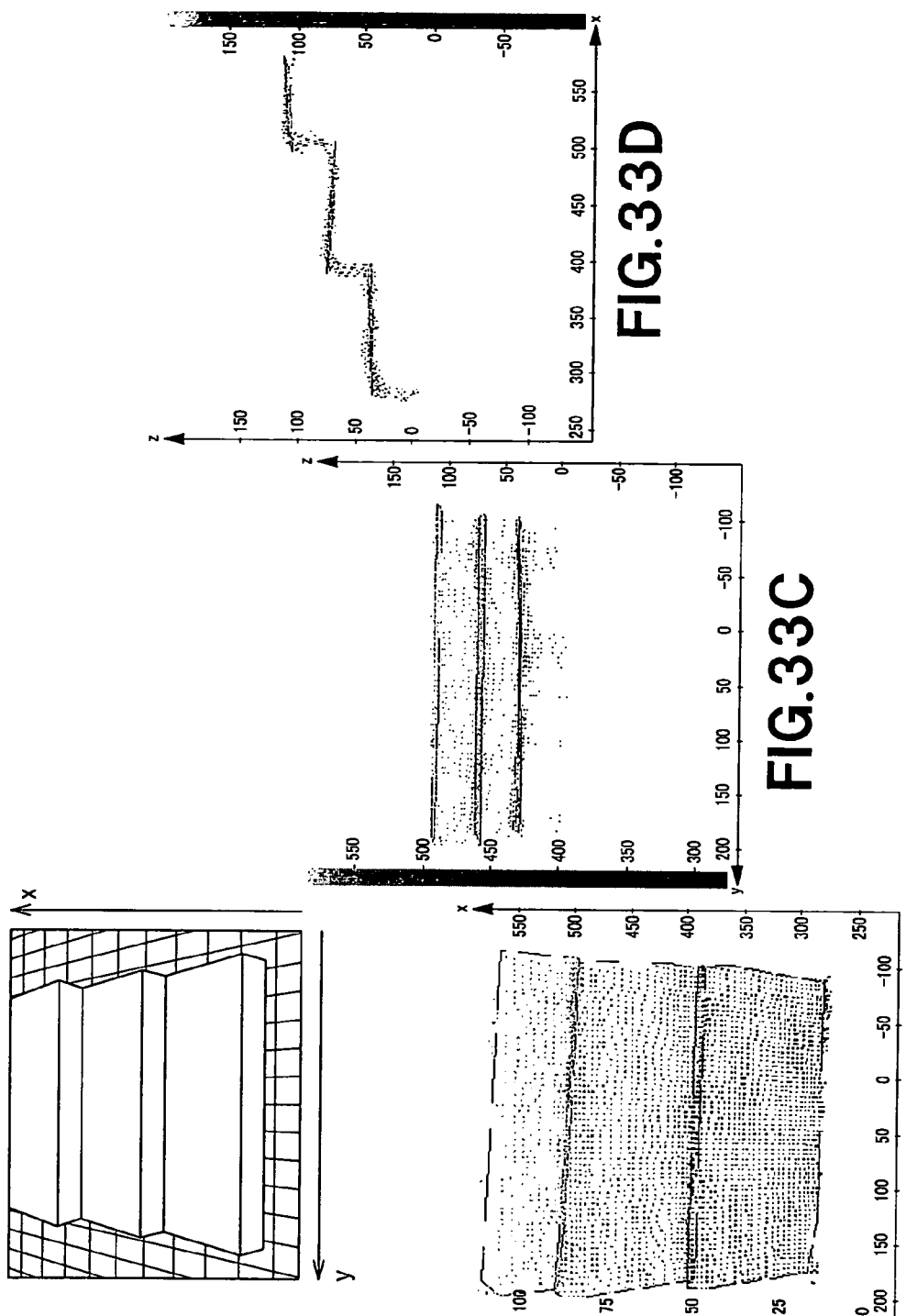

METHOD AND APPARATUS FOR DETECTING PLANE, AND ROBOT APPARATUS HAVING APPARATUS FOR DETECTING PLANE

TECHNICAL FIELD

The present invention generally relates to a method and apparatus for detecting plane, for detecting planes from three-dimensional distance data, and a robot apparatus having the apparatus for detecting plane installed therein, and more particularly to a method and apparatus for detecting plane, for detecting planes by the scan line grouping method, and a robot apparatus having the apparatus for detecting plane installed therein.

This application claims the priority of the Japanese Patent Application No. 2004-077215 filed on Mar. 17, 2004, the entirety of which is incorporated by reference herein.

BACKGROUND ART

Various researches have been made of algorithms for detecting a plane from three-dimensional distance data. A plane thus detected can be used to have a locomotion robot apparatus, for example, bypass an obstacle or climb stairs.

Generally, a plane is detected from distance information in the following steps:

1. Three-dimensional distance information is acquired.
2. The information is segmented for a plurality of planes.
3. For each of the plane segments, the center of gravity, plane equation, boundary, etc. are calculated.
4. The steps 2 and 3 are repeated to acquire an optimum method of segmentation.

For example, an image of stairs placed on a floor surface as shown in FIG. 1A is segmented into four planar regions A, B, C and D as shown in FIG. 1B. The region A indicates the floor part, and regions B, C and D show the stair parts.

Next, there will be briefly described the conventional techniques for detecting a plane from three-dimensional distance information, as disclosed in the following non-patent documents:

No. 1: A. Hoover, G. Jean-Baptiste, X. Jiang, P. J. Flynn, H. Bunke, D, Goldgof, K. Bowyer, D. Eggert, A. Fitsgibbon and R. Fisher, "An Experimental Comparison of Range Image Segmentation Algorithms", Transaction on Pattern Analysis Machine Intelligence, 18(7), 1996

No. 2: L. Iocchi, K. Konolige and M. Bajracharya, "Visually Realistic Mapping of Planar Environment with Stereo", Int. Symposium on Experimental Robotics (ISER), 2000

No. 3: K. Okada, S. Kagami, M. Inaba and H. Inoue, "Plane Segment Finder: Algorithm, Implementation, and Applications", Int. Conf. on Robotics and Automation (ICRA), 2001

No. 4: X. -Y. Jiang and H. Bunke, "Fast Segmentation of Range Images into Planar Regions by Scan Line Grouping", Machine Vision and Applications, 7(2), p 115, 122, 1994.

In the document No. 1, it is proposed to sample a reference point at random from distance information and detect a plane by connecting the reference point to points spatially near the reference point. In the document No. 2, it is proposed to detect a plane statistically from distance information by the Hough transformation. In the document No. 3, it is proposed to fit three points selected at random from distance information to the plane equation and detect a plane statistically by the randomized Hough transformation. In the document No. 4, it is proposed to use the scan line grouping method on the basis of the fact that a group of points in line in a range image will form a straight line in a space when the points are in one plane in a three-dimensional space.

Note that the plane detection using the distance information as disclosed in the above-mentioned non-patent document Nos. 1 to 4 incur important problems of "under-segmentation" and "over-segmentation" caused by noises.

The "under-segmentation" is such that a plurality of planes, actually existing, is recognized as one plane which will be resulted from averaging of them, for example, under the influence of noises. The "over-segmentation" is such that a single plane is recognized as a plurality of different planes under the influence of noises.

A range image captured by cameras 401R and 401L, as shown in FIG. 2, includes a plurality of treads, lateral surface and floor surface. In case there are stairs 400 in the field of view of the cameras 401R and 401L, for example, as shown in the upper portion of FIG. 2, a plurality of planes is included in the range image. Therefore, an x-z plane includes a plurality of planes such as treads 402, lateral surfaces 403, etc. as shown in the lower portion of FIG. 2. However, the under-segmentation will cause the plurality of planes to be detected as one plane 403 without distinction of the plurality of planes. Generally, the plane detection unit detects planes from measured data more influenced by noises than the required accuracy of plane detection. The plane detection unit has to be designed with a smaller threshold for breaking a plane into a plurality of plane segments, which will unavoidably lead to such an under-segmentation. On the contrary, reduction of the threshold for measured data much influenced by noises will lead to the over-segmentation, namely, segmentation of a plane into a plurality of planes.

In case a plane is estimated by the Hough transformation as in the aforementioned non-patent document Nos. 1 and 2, the under-segmentation will take place with a high possibility. FIGS. 3A to 3D explain the extraction of a plane by the Hough transformation. FIG. 3A shows stairs, FIG. 3B shows three-dimensional distance data acquired form the stairs in FIG. 3A, FIG. 3C shows peaks detected by the Hough transformation of the distance data in FIG. 3B, and FIG. 3D shows the result of comparison between a plane defined by the peaks in FIG. 3C and actual plane. When the stairs 410 are covered by the field of view as shown in FIG. 3, the three-dimensional data of the stairs will be as shown in FIG. 3B. Three points of this data are selected at random to determine a plane and the plane is placed in a plane parameter space to plot a histogram. Thus, a dominant plane can be determined as a peak P as shown in FIG. 3C, and a plane depending upon parameters indicated by the peak P is estimated to fall in the field of view.

However, when a plane is statistically estimated from data having subjected to the Hough transformation, the under-segmentation will result in a value which is statistically most dominant one. That is, the detected plane 411 will be determined as a plane which is a result of averaging all planes 412, 413 and 414, as shown in FIG. 3D. Namely, the Hough transformation permits to estimate and detect a dominant plane in the field of view, but not to detect a plurality of planes, if any, with a high accuracy.

The above-mentioned non-patent document No. 4 discloses a plane extraction method using the scan line grouping. In the plane detection by the scan line grouping, three-dimensional distance data is first acquired from a captured image, and processed as follows per line- or column-directional data train (image row). For example, a train of line-directional data in an image, which are in one plane in a three-dimensional space is in one line, which is utilized to generate line segments (will be referred to as "line" hereunder wherever appropriate) from a group of data points in one plane. Then, three adjacent lines in one plane are extracted from the generated group of lines to determine a reference plane. In case lines adjacent to the reference plane are in one plane, the region of the reference plane is grown by the adjacent lines and the reference plane is updated, whereby a plane is detected.

FIG. 4 shows a flow of operations made in the plane detection by the scan line grouping. As shown in FIG. 4, a range image (in step S41) is first supplied to generate lines from a group of data points estimated to be in one plane in each line- or column-directional data train forming the range image (in step S42). The generated line group is searched for a region which will be the seed of a plane (will be referred to as "seed region" hereunder) and selects the seed region (in steps S43 and 44). For this selection, vertically adjacent lines should be in one plane. A plane to which the seed region defined by the selected three lines is determined by averaging the three lines.

It is checked in the data train adjacent to the seed region selected in step S3 whether there are lines in a plane coplanar to the seed region. It is judged through a spatial comparison whether such lines are in one plane. In case there exist lines determined to be in one plane, the lines are added to the seed region (region growing) and the original plane including the added lines is updated (plane updating). These operations are repeatedly done to grow the region and update the plane (in step S45). Further, the operations in steps S43 to S45 are done repeatedly until no regions to be the seed are found. Finally, ones of a plurality of regions in a group thus determined, which form together one plane, are coupled to each other (in step S46) and the process is ended.

Each of the operations shown in FIG. 4 will be described in further detail below. Firstly, the line fitting in step S42 will be explained. FIG. 5 explains the conventional line fitting, in which FIGS. 5A to 5C show the steps of line fitting, respectively. First, a line (string) 431 connecting both ends 430a and 430b of a given group of data points 430 is generated as shown in FIG. 5A. Then, the data point group is searched for a data point whose distance to the generated line 431 is largest. In case the distance d between a data point 430c thus searched and line 431 exceeds a threshold, the line 431 is segmented. More specifically, the line 431 is segmented into a line 431a connecting the left end point 430a and data point 430c which is a break point, and a line 431b connecting the break point 430c and right end point 430b as shown in FIG. 5B. The segmentation is repeatedly done until the distance between all these points and lines becomes smaller than a threshold, whereby a plurality of lines fit to given data can be extracted. In this embodiment, the data points 430c and 430d which are finally break points at two places are selected as shown in FIG. 5C, and the line 431 is segmented into three lines 431a, 431c and 431d.

FIG. 25 explains the region growing done in step S45. A region can be segmented by sequentially merging the lines resulted from the aforementioned line fitting starting with the seed region. For example, in case there is a plurality of stairs 31 in an image 30 as shown in FIG. 25, it is assumed that there is selected a seed region defined by three lines 32a to 32c indicated each with a thick line, for example. In this case, these three lines 32a to 32c define together a seed region. First, one plane (reference plane) P defined by the three lines 32a to 32c is determined. Next, in a data train 33 or 34 adjacent, outside the seed region, to the line 32a or 32c at the outermost side of the seed region, lines coplanar with the plane P are selected. In this embodiment, the line 33a is selected. Then, a plane P' defined by the group of four lines is determined to update the reference plane P. Next, when the line 34a is selected, a plane P" defined by a group of five lines is determined to update the plane P'. By repeating these operations, the second tread of the stairs 31 can be determined as a plane 45 indicated with a dash line. The region growing operation is done in this way until there exist no additional lines for growing the selected seed region. When there are no additional lines, the image 30 is searched again for three lines which will define a seed region in order to make the region growing. These operations are repeatedly done. The operations in steps S43 to S45 in FIG. 4 are repeated until no further three lines for a seed region exist.

With the plane detection algorithm using the scan line grouping, however, it is extremely difficult to determine a threshold for the line fitting. Therefore, it is very difficult to exclude the influence of noises in the measured data. FIG. 6 shows results of the line fitting made with two different thresholds, respectively. FIGS. 6A shows the result of the line fitting operation made with one threshold set for a group of measured data points 450 with less noises, and 6B shows the result of the line fitting operation made with another threshold set for a group of measured data points 460 with many noises. The threshold for the line fitting as shown in FIG. 6A is a large one, while that for the line fitting as shown in FIG. 6B is a small one.

As shown in FIG. 6A, the large threshold set for line fitting of the group of measured data points 450 with less noises results in under-segmentation. For this line fitting, a small threshold will provide better results of line fitting. On the other hand, setting of a small threshold for line fitting of the group of measured data points 460 with many noises results in over-segmentation as shown in FIG. 6B For this line fitting, a large threshold has to be set. That is to say, with a small threshold, a line will be segmented excessively small under the influence of noises, and it is not possible to extract lines which could normally be extracted.

Generally, data acquired by the distance measuring unit (range finder) such as stereo vision system from a near point is highly accurate and have less noises, but data acquired from a far point is low in accuracy and has many noises. Therefore, it is desirable to set a threshold adaptively to a distance between the range finer and object point. However, since the variation in measuring accuracy due to the environment will have an influence on the data acquisition, it is difficult to set a unique threshold for such a data acquisition.

In effect, the plane detection based on the randomized Hough transformation is suitable for use to detect a dominant plane, but when applied for detection of a plurality of planes from data including a plurality of planes such as stairs, it will cause the under-segmentation problem. Also, when the scan line grouping is used to extract planes, it is difficult to set a threshold for the line fitting. Use of the scan line grouping will cause the over-segmentation and under-segmentation problems. Both the randomized Hough transformation and scan line grouping are not advantageous in that it is difficult to detect planes accurately from measured distance data.

DISCLOSURE OF THE INVENTION

It is therefore an object of the present invention to overcome the above-mentioned drawbacks of the related art by providing a method and apparatus for detecting plane, capable of detecting a plurality of planes from distance data including measuring noises with robustness against noises simultaneously and a robot apparatus having the apparatus for detecting plane installed therein.

The above object can be attained by providing a plane detection apparatus for detecting planes from three-dimensional distance data, the apparatus including according to the present invention:

a line fitting means for fitting a line to each group of distance data points estimated to be in one plane in a three-dimensional space; and a planar region growing means for extracting a plurality of lines estimated to be in one plane from a group of lines extracted by the line fitting means to calculate a plane from the plurality of lines, the line fitting means fitting lines adaptively to the distribution of distance data points.

In the above plane detection apparatus according to the present invention, the line fitting means extracts lines on the basis of the fact that three-dimensional distance data in one plane will be in one straight line. Since the distribution of the distance data points varies under the influence of noises, however, lines are fit adaptively to the distribution of distance data (called "adaptive line fitting"), which enables an accurate line fitting robust against noises. Also, determination, by the scan line grouping, of a plane from the plurality of lines thus fitted permits an accurate plane detection without taking, under the influence of noises or the like, a plurality of planes as one plane or a single plane as a plurality of planes.

Also, the line fitting means can extract lines accurately by extracting a group of distance data points estimated to be in one plane on the basis of the distance between the distance data points to re-estimate, based on the distribution of distance data points in the group of distance data points, whether the group of distance data points is in one plane, and extracting a group of distance data points once on the basis of the distance between the distance data points in a three-dimensional space to re-estimate, based on the data point distribution, whether the distance data points are in one plane.

Further, the line fitting means can extract lines from the group of distance data points estimated to be in one plane, take one of the distance data points in group, whose distance to the lines is largest, as a point of interest, judge, when the distance is smaller than a predetermined threshold, whether the distance data points are unevenly distributed, and segment the group of distance data points by the point of interest when the distance data point distribution is determined to be uneven or determine, when the distribution is determined to be uneven, that the extracted distance data points are not in one plane and segment the group of distance data points by the point of interest.

Furthermore, the line fitting means can extract a first line from the group of distance data points estimated to lie in one plane, take a distance data point in the group, whose distance from the first line is longest, as a point of interest, extract a second line from the distance data point group in case the distance is smaller than a predetermined threshold, judge whether a larger number of distance data points than a predetermined number exist continuously at one side of the second line and divide the distance data point group by the point of interest in case the larger number of distance data points than the predetermined number exist continuously. For example, the line fitting means takes a line connecting end points of an extracted data point group as the first line, and generates a second line by the least-squares method, for example, in case there exists a point whose distance from the first line is long. In case there exists a plurality of data points continuously at one side of the second line, the line fitting means can assume that the data point group is in the zig-zag shape, for example, in relation to the line and thus determine that the extracted data point group is biased, and segment the data point group by the point of interest or the like.

Also, the planar region grouping means can select more than one line estimated to be in one plane and calculate a reference plane, search lines estimated to be in the plane in which the reference plane lies as grouping lines from the group of lines, update the reference plane with the grouping lines and repeat the grouping of the region of the reference plane, and output the updated plane as an updated one. Thus, the planar region grouping means can make the planar region growing and plane updating with the lines estimated to lie in one plane.

Further, the planar region grouping means may includes a plane recalculating means for recalculating a plane from the group of distance data points except for ones whose distance from the updated plane is larger than a predetermined threshold, if any, existing in the distance data point group in the updated plane. Since the updated plane is taken as a plane in which all lines are uniformly distributed, it is possible to have a result of extraction less influenced by noises or the like by recalculating a plane from the group of distance data points except for ones largely different from the plane in which all the lines are uniformly distributed.

Furthermore, the planar region grouping means can estimate, based on a difference between a lines-determined plane and reference plane, whether the lines lie coplanar with the reference plane. Namely, it is possible to extract a plane more accurately by judging, based on a root mean square residual of the plane equation, for example, whether the extraction has been influenced by noises or the lines are not coplanar with the reference plane.

Also the above object can be attained by providing a plane detection method of detecting planes from three-dimensional distance data, the method including according to the present invention:

a line fitting step of fitting a line to each group of distance data points estimated to be in one plane in a three-dimensional space; and a planar region growing step of extracting a plurality of lines estimated to be in one plane from a group of lines extracted by the line fitting means to calculate a plane from the plurality of lines, in the line fitting step, lines being fitted adaptively to the distribution of distance data points.

Also the above object can be attained by providing an autonomous locomotion robot apparatus including according to the present invention:

a distance measuring means for acquiring three-dimensional distance data;

a plane detection apparatus for detecting a plane from the three-dimensional distance data; and a motion controlling means for controlling the motion of the apparatus on the basis of the result of plane detection by the plane detection apparatus, the plane detection apparatus including:
  a line fitting means for fitting a line to each group of distance data points estimated to be in one plane in a three-dimensional space; and
  a planar region growing means for extracting a plurality of lines estimated to be in one plane from a group of lines extracted by the line fitting means to calculate a plane from the plurality of lines,
  the line fitting means fitting lines adaptively to the distribution of distance data points.

The robot apparatus may further include a texture imparting means such as an illuminating means for projecting a texture onto an object. In case the distance measuring means is a stereo camera or the like which is based on the parallax to acquire a range image, if an object to be viewed, such as stairs, floor surface or the like, has no or insufficient texture on it, the range image cannot be well acquired. The texture imparting means can impart a texture to the object to acquire an accurate range image.

The plane detection apparatus and method permit to accurately extract lines from even distance data with noises by fitting lines adaptively to the distribution of distance data point when detecting a plane by the scan line grouping, and detect a plane very accurately by detecting the plane by the scan line grouping with the user of the lines.

Also, the above-mentioned plane detection apparatus installed in the robot apparatus according to the present invention permits to detect a plane accurately even if the distance measuring means provided in the robot apparatus has acquired distance data with noises, detect stairs in an environment around the robot apparatus and have the robot apparatus climb the stairs or recognize a step on a floor and have the robot apparatus move on the stepped floor. Thus, the robot apparatus will provide a greater entertainment.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 1A schematically illustrates an image of stairs and FIG. 1B shows results of extraction of four planar regions A, B, C and D from the three-dimensional distance data acquired from the image in FIG. 1A.

FIGS. 3A to 3D explain how to extract a plane by the Hough transformation, in which FIG. 3A shows stairs, FIG. 3B shows three-dimensional distance data acquired form the stairs in FIG. 3A, FIG. 3C shows a histogram resulted from the Hough transformation of the distance data in FIG. 3B, and FIG. 3D shows the result of comparison between a plane defined by peaks in FIG. 3C and actual plane.

FIG. 5 explains the conventional line fitting, in which

FIG. 12 schematically illustrates stairs, in which

FIG. 13 schematically illustrates another example of stairs, in which

FIG. 16A schematically illustrates an image of the stairs in FIG. 13 captured obliquely from the front by a stereo vision system and FIGS. 16B to 16D show three-dimensional distance data taken from the image shown in FIG. 16A;

FIG. 21 shows how distance data points are distributed, in which FIG. 21A shows the data being distributed in the zig-zag shape in relation to a line and FIG. 21B shows the data being distributed evenly near a line under the influence of noises or the like;

FIG. 23 shows the zig-zag shape discrimination;

FIG. 27 schematically illustrates examples equal in distance between an end point and straight line to each other but different in root mean square residual rms of the plane equation from each other, in which FIG. 27A shows an example in which the line is off the plane under the influence of noises or the like and FIG. 27B shows an example in which there exists another plane in which the line is;

FIG. 28 shows selection of a seed region;

FIG. 29 shows the region growing;

FIG. 31 explains the difference in result of performance between the plane detection method according to this embodiment and conventional plane detection method when a step is placed on a flat surface, in which FIG. 31A schematically illustrates an image being viewed, FIG. 31B shows experimental conditions, FIG. 31C shows the results of plane detection by the plane detection method according to this embodiment, and FIG. 31D shows the results of plane detection by the conventional plane detection method.

FIG. 33A schematically illustrates an image of stairs, and FIGS. 33B to 33D show examples of the plane detected from top, front and bottom on the basis of the three-dimensional distance data acquired from the image in FIG. 33A.

BEST MODE FOR CARRYING OUT THE INVENTION

The embodiment which will be illustrated and explained hereunder is an application of the present invention to a robot apparatus having installed therein a plane detection apparatus capable of detecting a plurality of planes simultaneously and accurately.

The plane detection apparatus according to the embodiment can extract a plurality of planes from range information acquired using a stereo vision system. Namely, it can make a detection robust against measuring noises. For example, the plane detection apparatus installed in a robot apparatus enables the robot apparatus to accurately recognize its environment such as an object including a plurality of planes such as stairs and surroundings and autonomously move and act according to the result of recognition.

The embodiment will be explained first concerning a robot apparatus of bipedal walking type as an example. The robot apparatus is a practical-use robot which supports human activities in various living environments and other daily lives. It is also an entertainment robot capable of acting correspondingly to its internal status (anger, sadness, joy, pleasure, etc.) and imitating basic behaviors of the human being. It should be noted that although the present invention will be explained as to a bipedal walking robot apparatus as an example, the present invention may of course be applied to a four-egged or wheeled locomotion robot apparatus.

Figure 2:
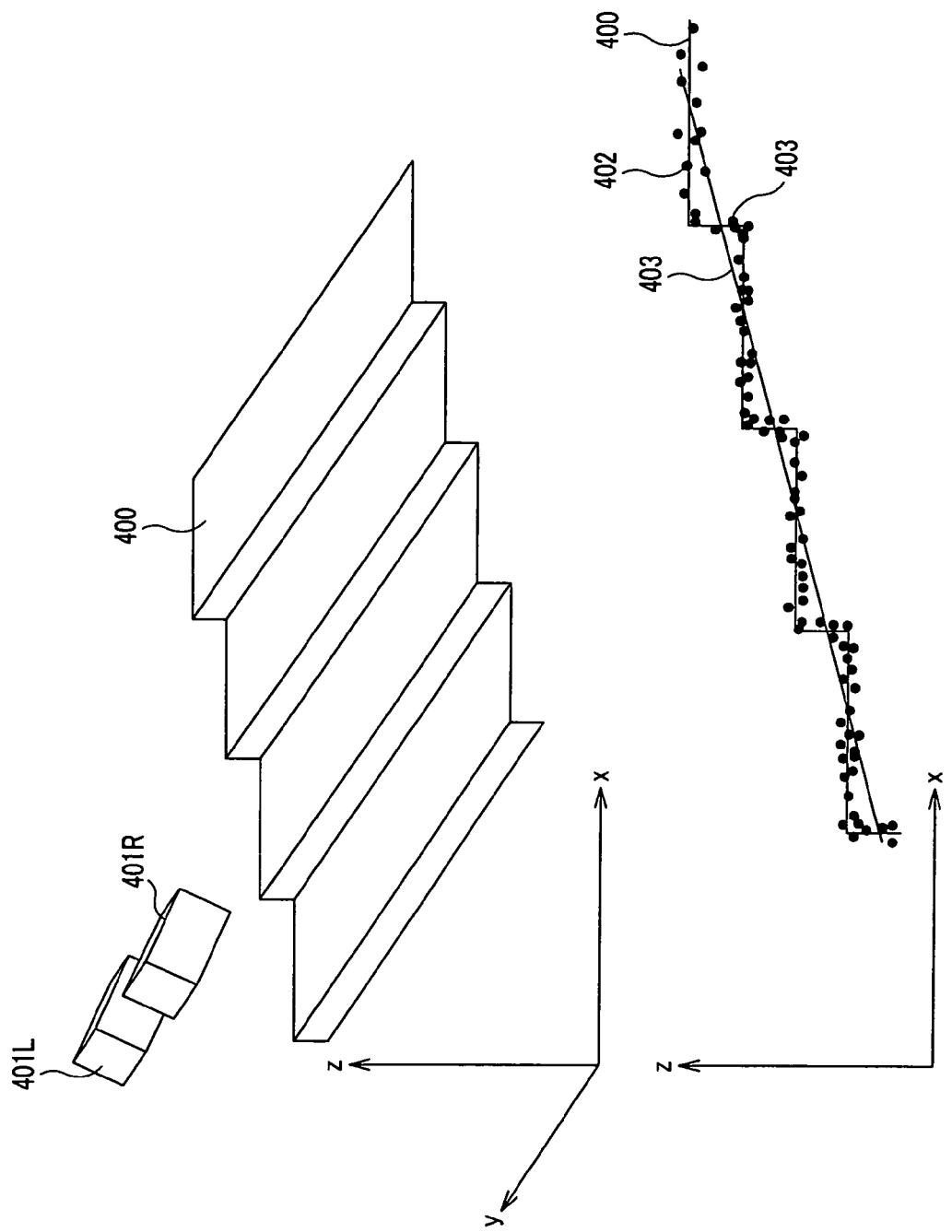
FIG. 2 is a schematic illustration of "under-segmentation"
Figure 3A:
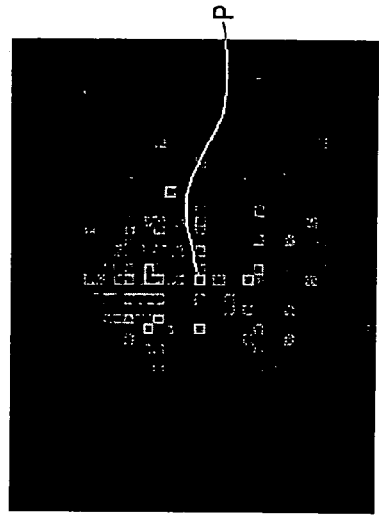
Figure 3B:
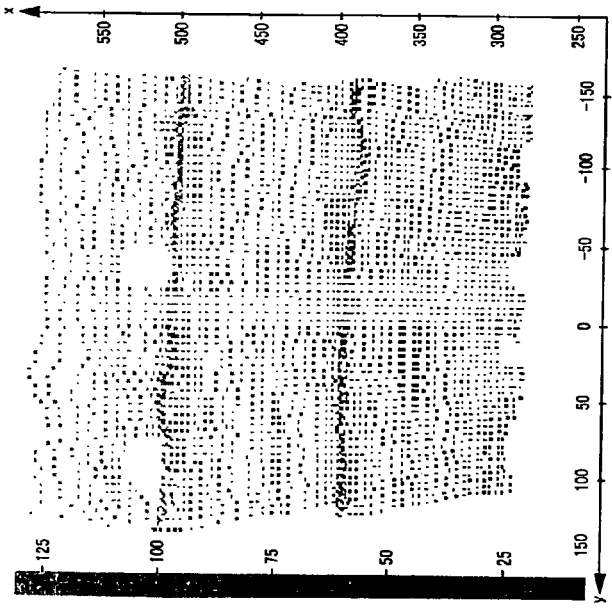
Figure 3C:
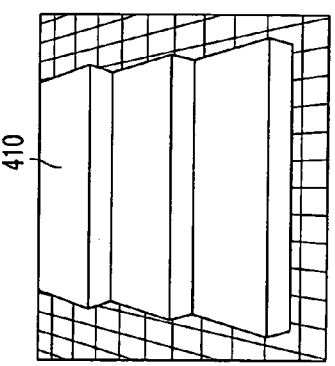
Figure 3D:
Figure 4:
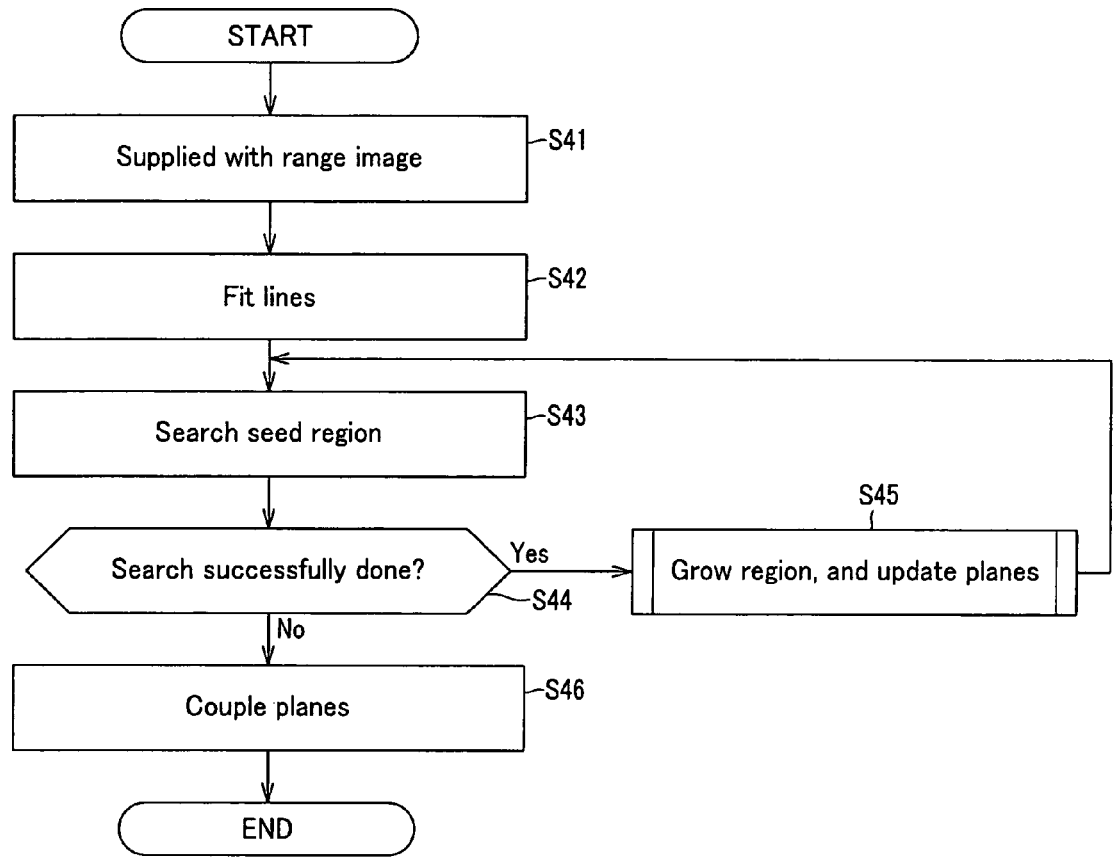
FIG. 4 shows a flow of operations made in plane detection by the scan line grouping.
Figure 5A:
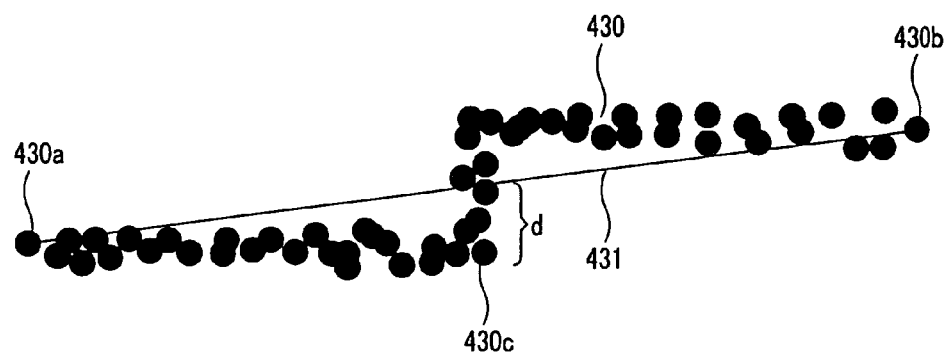
FIGS. 5A to 5C show the steps of line fitting, respectively.
Figure 5B:
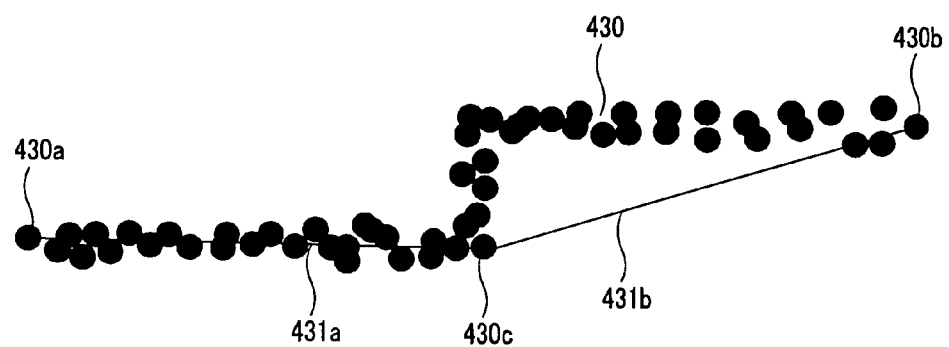
Figure 5C:
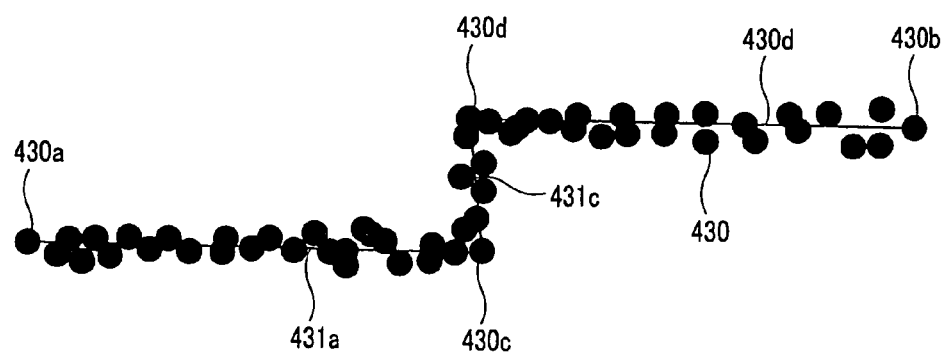
Figure 6B:
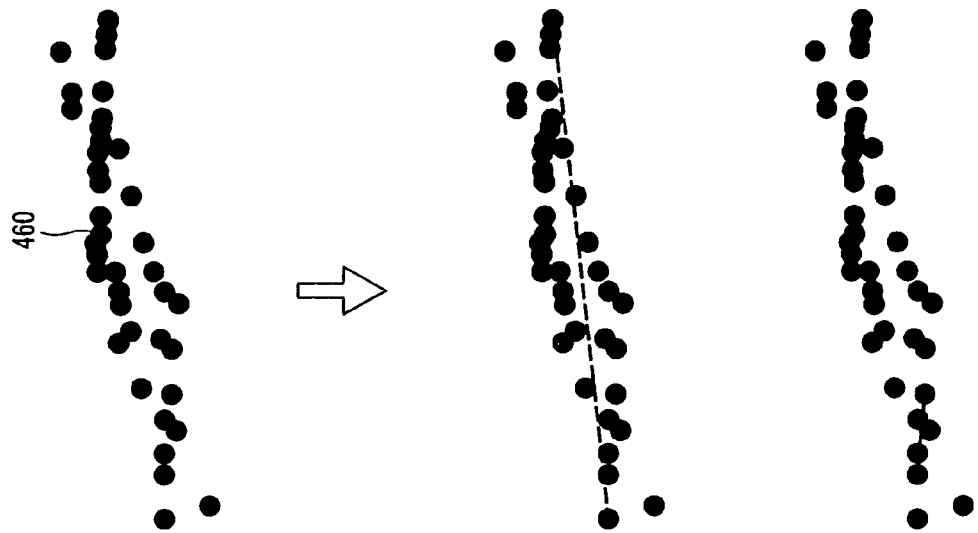
FIGS. 6A and 6B show the results of line fitting operations made with difference thresholds, respectively, set for a group of measured data points with less noises and a group of measured data points with many noises, respectively.
Figure 6A:
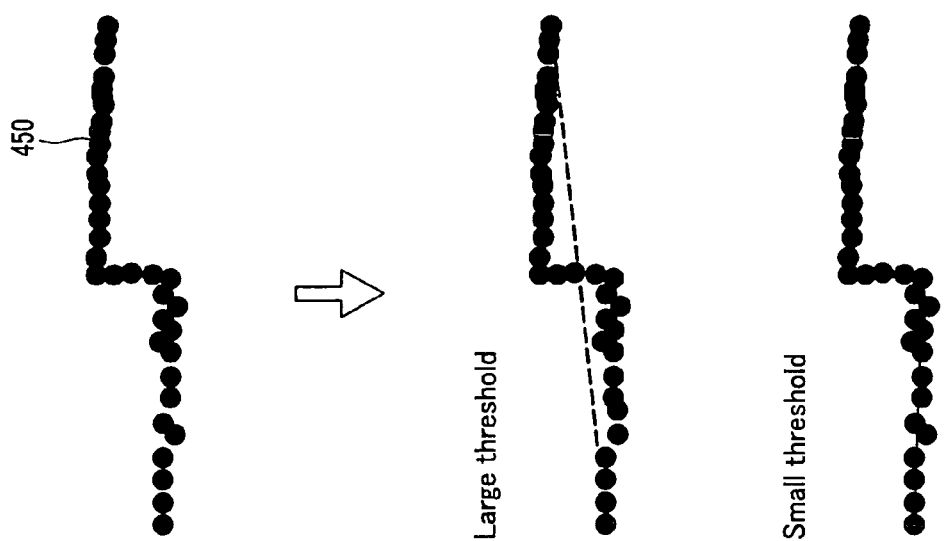
Figure 7:
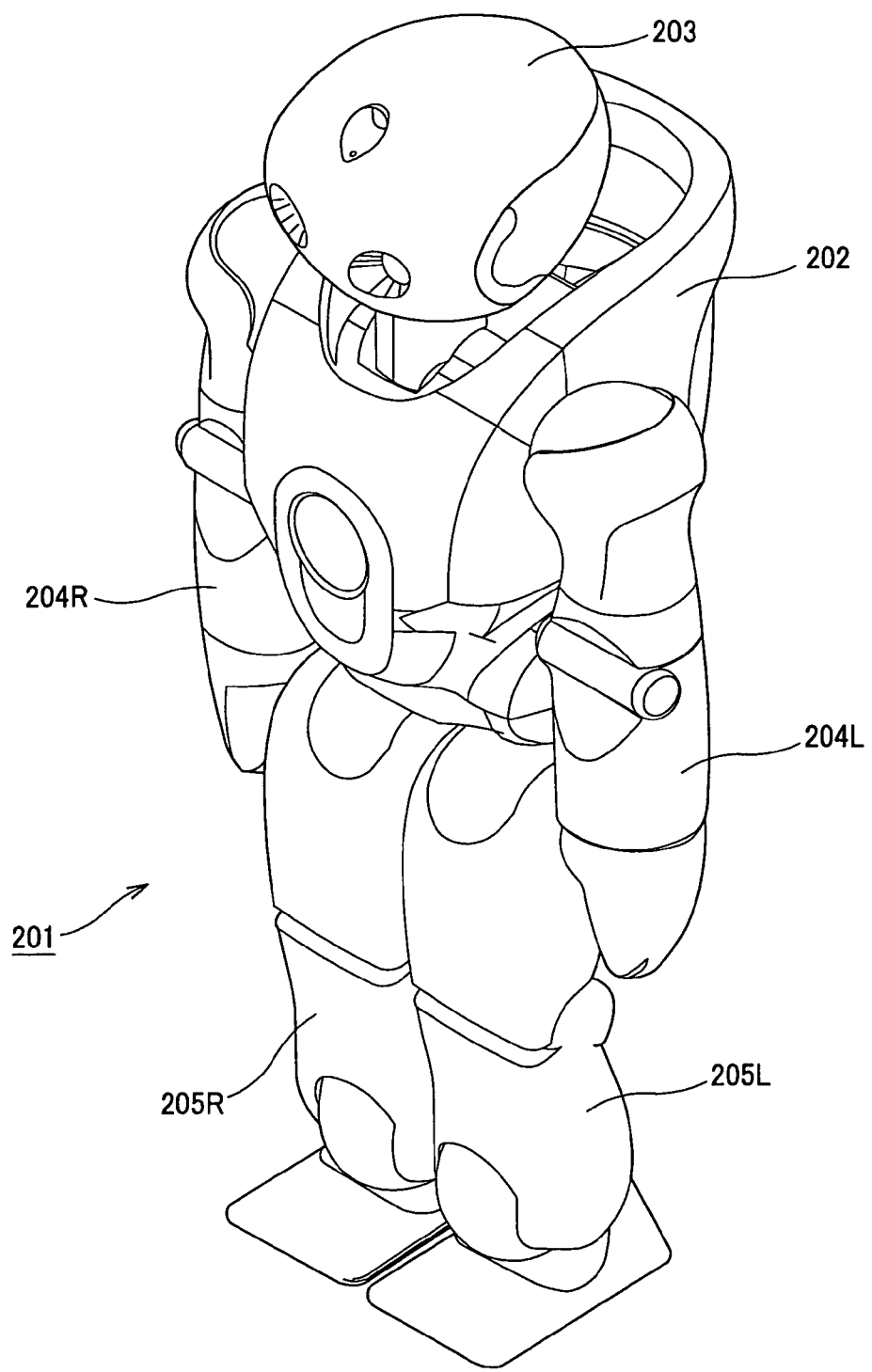
FIG. 7 is a perspective view of a robot apparatus according to the present invention.

FIG. 7 is a perspective view of a robot apparatus according to the embodiment of the present invention, showing the concept of the robot apparatus. As shown in FIG. 7, the robot apparatus, generally indicated with a reference numeral 201, includes a body unit 202 and a head unit 203, two arm units 204R and 204L, and two leg units 205R and 205L, each connected in a predetermined position to the body unit 202 (note that "R" and "L" indicate "right" and "left", respectively; this is also true for the following illustration and description).

Figure 8:
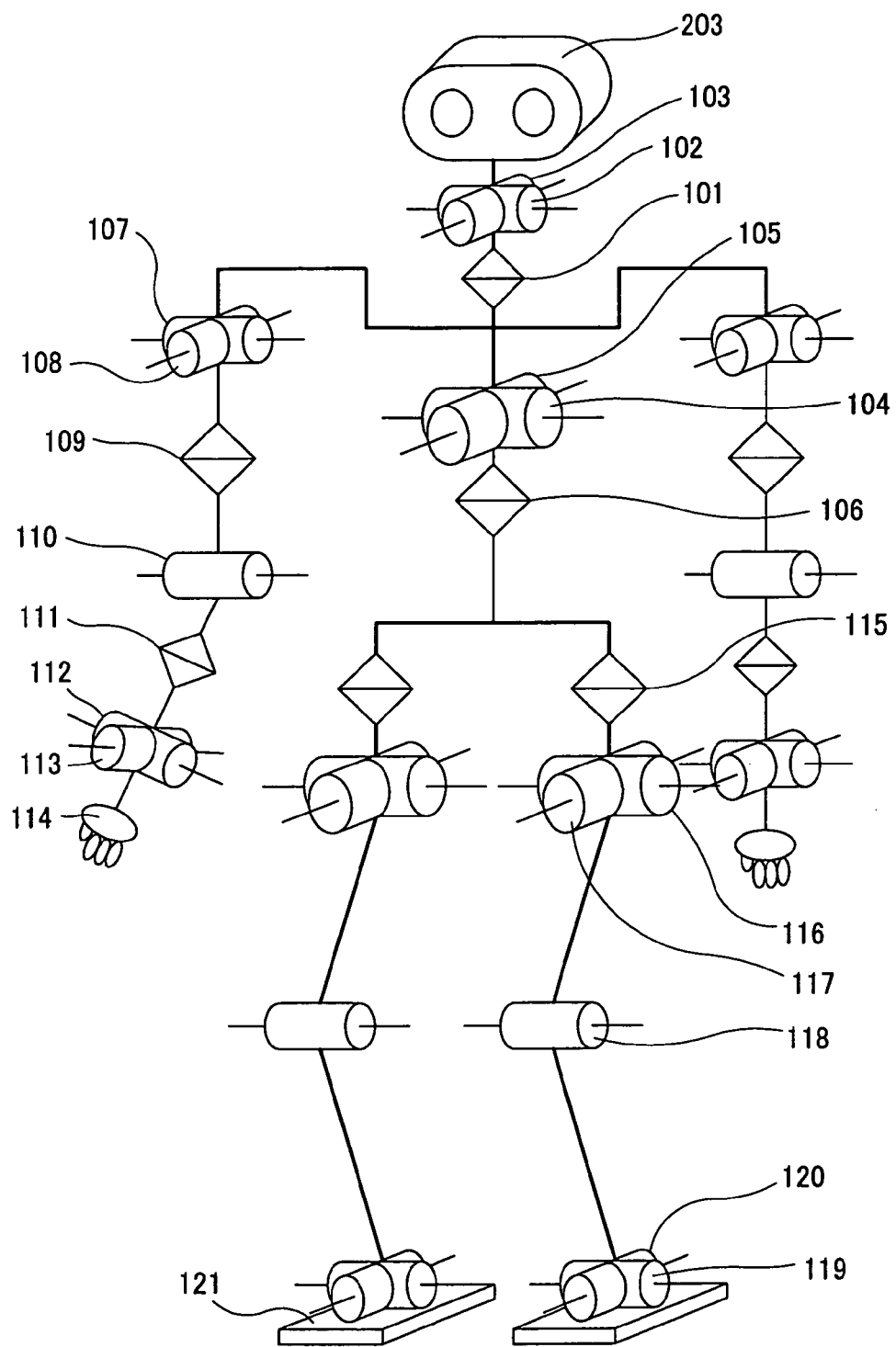
FIG. 8 schematically illustrates the degrees of freedom of the joints of the robot apparatus.

The degrees of freedom of the joints of the robot apparatus 201 are schematically illustrated in FIG. 8. The neck joint supporting the head unit 203 has three degrees of freedom including a neck joint yaw axis 101, neck joint pitch axis 102 and neck joint roll axis 103.

Also, each of the arm units 204R and 204L forming together each upper limb includes a shoulder joint pitch axis 107, shoulder joint roll axis 108, upper arm yaw axis 109, elbow joint pitch axis 110, lower arm yaw axis 111, wrist joint pitch axis 112, wrist joint roll axis 113 and a hand 114. The hand 114 is actually a multijoint, multi-freedom structure including a plurality of fingers. However, since the motion of the hand 114 little contributes to or influences the control over the attitude and walking of the robot apparatus 201, it is assumed herein for the simplicity of the explanation that hand 114 has no degree of freedom. Therefore, each arm unit has seven degrees of freedom.

Also, the body unit 202 has three degrees of freedom including a body pitch axis 104, body roll axis 105 and body yaw axis 106.

Also, each of the leg units 205R and 205L forming together each lower limb includes a hip joint yaw axis 115, hip joint pitch axis 116, hip joint roll axis 117, knee joint pitch axis 118, ankle joint pitch axis 119, ankle joint roll axis 120 and a foot base 121. It is defined herein that the intersection of the hip joint pitch axis 116 and hip joint roll axis 117 is the hip joint position of the robot apparatus 201. The foot base or sole 121 of the human body is actually a multijoint, multi-freedom structure. It is assumed herein for the simplicity of explanation that the foot base of the robot apparatus 201 has no degree of freedom. Therefore, each leg unit has six degrees of freedom.

As above, the robot apparatus 201 has a total of 32 degrees of freedom (=3 +7×2+3+6×2). However, the robot apparatus 201 destined for entertainment has not always the 32 degrees of freedom. It is of course that the entertainment robot apparatus can be designed to have an appropriately smaller or larger number of degrees of freedom, namely, of joints, depending upon the constraints on the design and manufacture, specifications required for the intended robot apparatus, etc.

Each of the above-mentioned degrees of freedom of the robot apparatus 201 is actually implemented by an actuator. To provide a robot apparatus having a shape approximate to the natural shape of the human body without excessive apparent bulge and control the attitude of an unstable structure such as a bipedal walking robot apparatus, the actuator should preferably be compact and lightweight.

Figure 9:
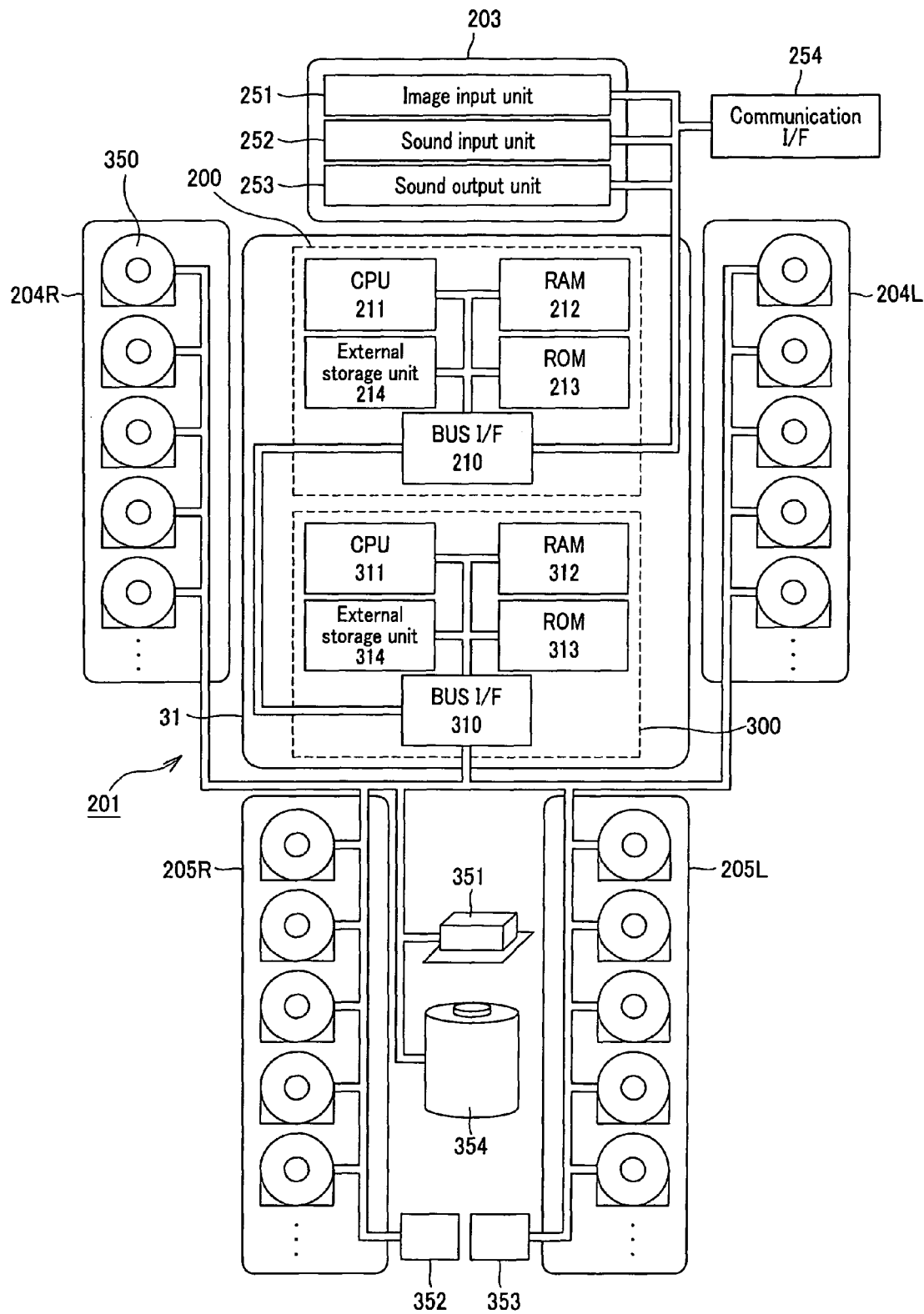
FIG. 9 schematically illustrates the control system employed in the robot apparatus.

The above-mentioned robot apparatus has provided in the body unit 202, for example, a control system to control the motions of the entire robot apparatus itself. FIG. 9 schematically illustrates the control system employed in the robot apparatus 201. As shown in FIG. 9, the control system includes a thought control module 200 dynamically responsive to a user's input or the like to control the emotion judgment and sentiment expression, and a motion control module 300 to control the whole-body coordinated motion of the robot apparatus 201, such as the driving of actuators 350.

The thought control module 200 is an independently driving type information processing unit including a central processing unit (CPU) 211 to make calculations as to the emotion judgment and sentiment expression, random-access memory (RAM) 212, read-only memory (ROM) 213, external storage unit (such as a hard disk drive) 214, etc. and which can make a self-contained processing within itself.

The thought control module 200 determines a current sentiment and will of the robot apparatus 201 according to an external stimulus or the like such as image data supplied from an image input unit 251, sound data supplied from a sound input unit 252, etc. That is, the thought control module 200 can recognize the facial expression of the user of the robot apparatus 201 on the basis of the input image data and make an action corresponding to the user's facial expression by reflecting the information on the sentiment and will of the robot apparatus 201. The image input unit 251 included in the present invention includes a plurality of CCD (charge-coupled device) cameras, for example, and can acquire a range image based on images captured by the cameras. Also, the sound input unit 252 includes a plurality of microphones, for example.

The thought control module 200 issues a command to the motion control module 300 for execution of a sequence of motions or actions based on the determined will, that is, motions of the four limbs.

The motion control module 300 is an independent drive type information processor including a CPU 311 to control the whole-body coordinated motion of the robot apparatus 201, RAM 312, ROM 313, external storage unit (such as hard disk drive) 314, etc. and which can make a self-contained processing within itself. Also, the external storage unit 314 can store a walking pattern, target ZMP trajectory and other action plan calculated on offline basis, for example.

The motion control module 300 has connected thereto, by a bus interface (I/F) 310, various units including actuators 350 to implement degrees of freedom of the joints located on the whole body of the robot apparatus 201 as shown in FIG. 8, distance measuring sensors (not shown) to measure a distance from the robot apparatus 201 to an object, attitude sensor 351 to measure the attitude and inclination of the body unit 202 of the robot apparatus 201, landing checking sensors 352 and 353 to detect when the robot apparatus 201 lifts the right or left foot base 121 from a surface or places the foot base on the surface, load sensor provided on the foot base 121, power controller 354 to control the power source such as a battery or the like, etc. It should be noted here that the attitude sensor 351 is for example a combination of an acceleration sensor and gyro sensor and each of the landing checking sensors 352 and 353 is formed from a proximity sensor, microswitch or the like.

The thought control module 200 and motion control module 300 are built on a common platform and connected to each other by the bus interface 310 and a bus interface 210.

The motion control module 300 controls the whole-body coordinated motion made by the actuators 350 to implement an action commanded from the thought control module 200. More specifically, the CPU 311 calls a motion pattern corresponding to a motion commanded from the thought control module 200 from the external storage unit 314 or internally creates a motion pattern. Then, the CPU 311 sets, according to the specified motion pattern, a foot motion, ZMP (zero moment point) trajectory, body motion, upper-limb motion, horizontal position and height of the hip, etc. and transfers command values commanding motions corresponding to the settings to the actuators 350.

Also, the CPU 311 can adaptively control the whole-body coordinated motion of the robot apparatus 201 by detecting the attitude and inclination of the body unit 202 of the robot apparatus 201 on the basis of an output signal from the attitude sensor 351, while detecting, based on output signals from the landing checking sensors 352 and 353, whether the leg unit 205R or 205L is in swinging phase or in supporting phase. Further, the CPU 311 controls the attitude and motion of the robot apparatus 201 for the ZMP (zero moment position) to always be positioned toward the center of ZMP-stable region.

Also, the motion control module 300 is designed to return to what extent an action corresponding to a will determined in the thought control module 200 has been implemented, that is, the progress of operation, to the thought control module 200. Thus, the robot apparatus 201 can judge its internal and surrounding conditions on the basis of a control program, and act autonomously.

A stereo vision system may be installed in the head unit 203 of the above robot apparatus to acquire three-dimensional distance information from outside. Next, the plane detection apparatus according to this embodiment, which utilizes three-dimensional distance information acquired by means of the stereo vision system, will be explained. It should be noted that the distance information may of course be acquired by the use of a laser range finder or the like.

The plane detection apparatus adopted in this embodiment can positively extract, by the scan line grouping method, a prevailing plane in the field of view as well as even a plurality of planes such as stairs. Also, in the line fitting effected for extraction of a plane or planes, the plane detection apparatus can permit a plane extraction robust against any measuring noises by fitting the lines adaptively to the distribution of distance data points.

Figure 10:
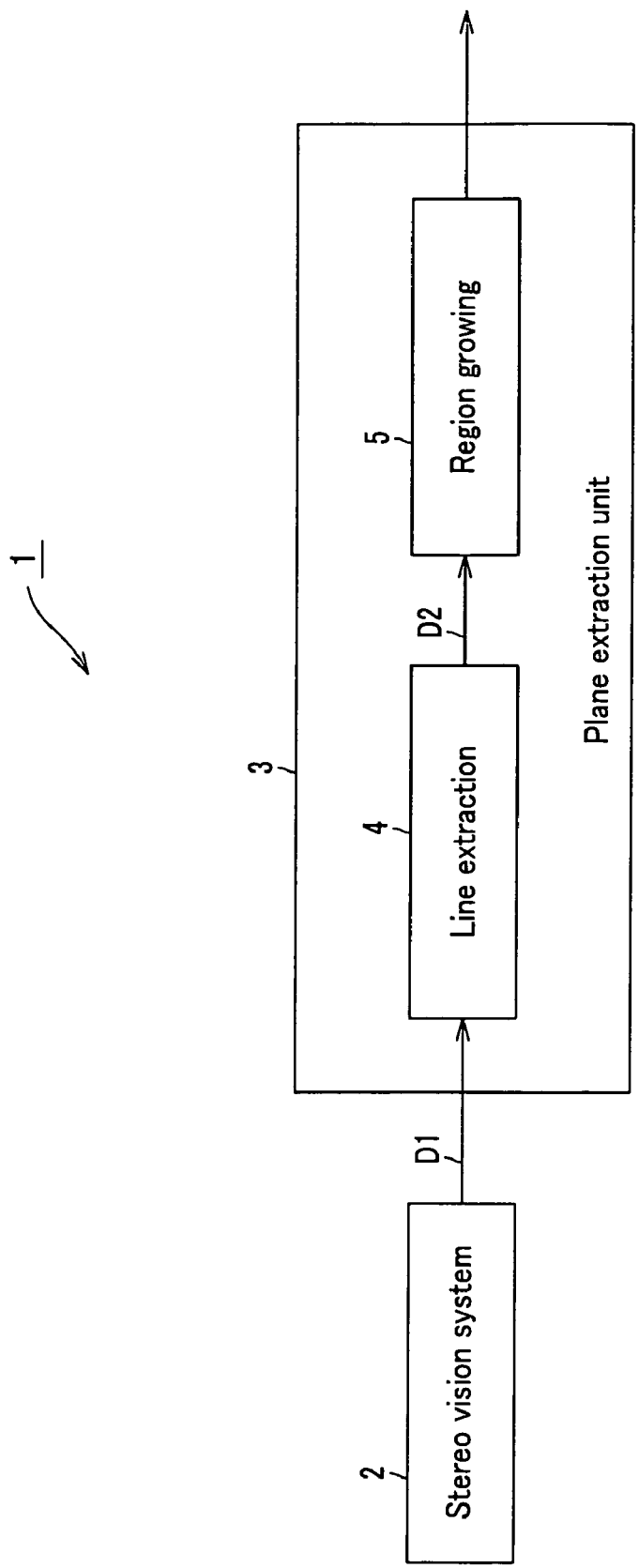
FIG. 10 is a functional block diagram of a plane detection apparatus used in the embodiment of the present invention.

FIG. 10 shows functional blocks of the plane detection apparatus used in the embodiment. As shown in FIG. 10, the plane detection apparatus, generally indicated with a reference numeral 1, includes a stereo vision system 2 as a distance data acquiring means for acquiring three-dimensional distance data, and a plane detection unit 3 to extract planes included in a range image formed from the three-dimensional distance data by the scan line grouping method. The plane detection unit 3 includes a line fitting block 4 to select groups of distance data points estimated to be in one plane from the distance data points forming the range image and extract lines from each of distance data points in a group, and a region growing block 5 to grow one or a plurality of planar regions in the image from a line group including all the lines extracted by the line fitting block 4. The region growing block 5 selects three arbitrary lines estimated to be in one plane from the line group and determines a reference plane on the basis of the three lines. Then, the region growing block 5 judges whether the lines adjacent to the selected three lines are in one plane. When it determines that the adjacent lines are in one plane, it will update the reference plane with the lines as region growing lines and grow the region of the reference plane.

The stereo vision system 2 is to generate a range image from an image acquired by the image input unit 251 of the robot apparatus 201. It outputs, to the line fitting block 4, three-dimensional distance data D1 estimated based on the parallax of both the eyes from the result of viewing of the surroundings.

The line fitting block 4 extracts a group of distance data points estimated to be in one plane in a three-dimensional space from each of the data trains along rows or lines of the range image and generates more than one line from the group of distance data points correspondingly to the distribution of the distance data points group. More specifically, if it is determined that the distribution is not uniform, it will be determined that the data point groups are not in one plane and the data point groups are segmented, it is judged whether or not each of the segmented groups of data points is distributed uniformly. These operations are repeatedly done. In case the distribution is determined to be uniform, lines are generated from the group of data points. The above operations are done as to all the data trains to generate a group of generated lines, and the line group D2 is delivered to the region growing block 5.

The region growing block 5 selects, from the line group D2, three lines estimated to be in one plane, and determines a plane which will be the seed of the reference plane on the basis of the three lines. By sequentially merging the planar region which will be the seed region with lines being in one plane in which the seed region also lies to grow the region, the range image is segmented into a plurality of planes to output a plane group D3.

Effecting the above operations when plane information is required for bypassing an obstacle or for stair climbing, the robot apparatus 201 acquires information on planes essential for the walking, such as stairs, floor surface, walls, etc.

Next, the stereo vision system 2 included in the plane detection apparatus 1 will be described in further detail. The stereo vision system 2 compares image inputs from the two cameras, right and left, equivalent to both the human eyes concerning each of pixel-adjacent points to estimate a distance from the parallax to the object, and outputs three-dimensional distance information as an image (range image).

Figure 11:
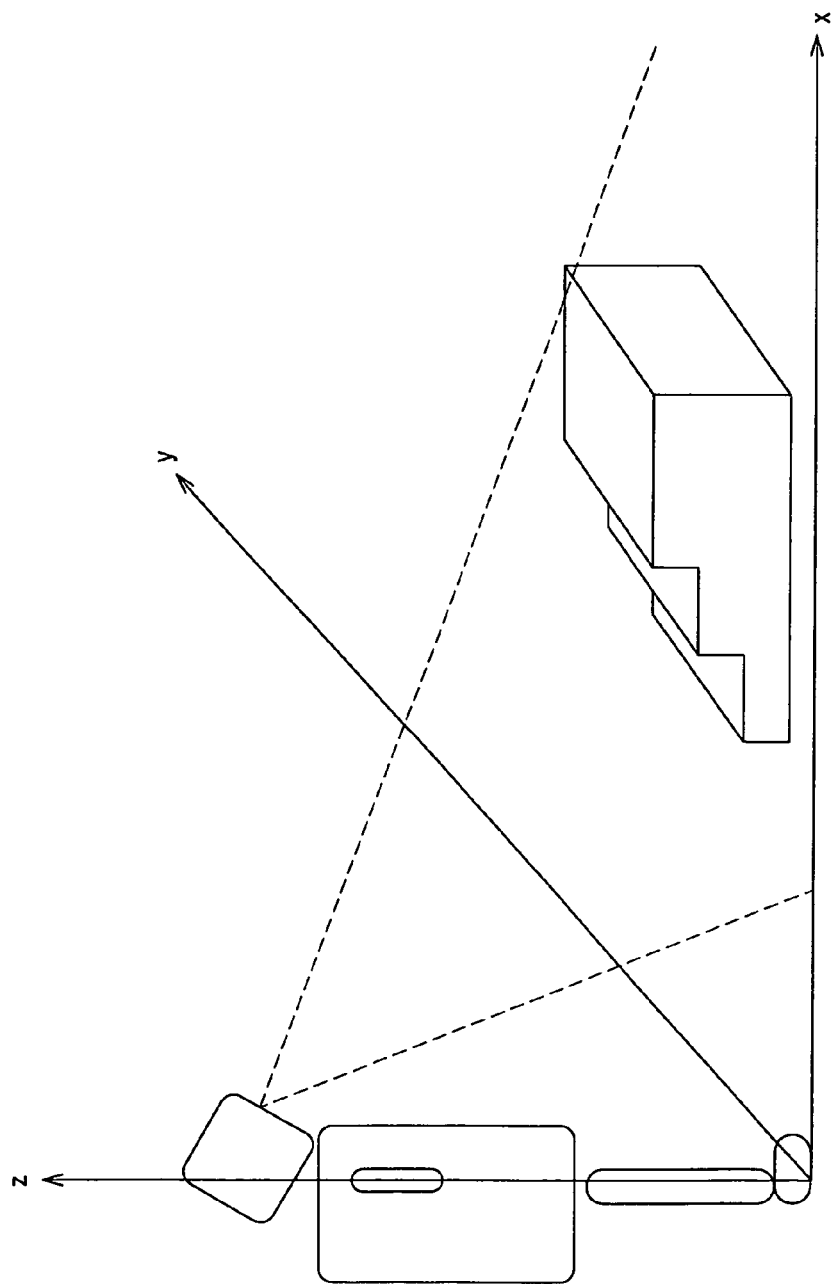
FIG. 11 schematically illustrates the robot apparatus taking a picture of its surroundings.

FIG. 11 is a schematic illustration showing the robot apparatus 201 taking a picture of the surrounding environment. On the assumption that the floor-surface plane is x-y and the height direction is z, the robot apparatus 201 having an image input unit (stereo camera) installed in the head unit 203 thereof can view a predetermined field in front thereof as shown in FIG. 11.

In the robot apparatus 201, the CPU 211 is supplied with a color image and parallax image from the image input unit 251 and all sensor data such as joint angles and the like from the actuators 350 to execute a software.

The software executed in the robot apparatus 201 according to this embodiment is configured in units of an object to permit various operations for recognition of the position of the robot apparatus itself, moving distance of the robot apparatus, obstacle or obstacles lying around the robot apparatus, environmental map, etc., and outputting of a train of actions to finally be done by the robot apparatus. It should be noted that this embodiment of the present invention uses two coordinates including a camera coordinate system of a world-standard type whose origin is a position predetermined based on a specific object such as a landmark (will also be referred to as "absolute coordinate" hereunder) and a robot-center coordinate system whose center (coordinate origin) is the robot apparatus itself (will also be referred to as "relative coordinate" hereunder).

In the stereo vision system 2, joint angles determined from the sensor data are utilized to transform the robot-center coordinate system having the robot apparatus 201 fixed at the center thereof into the coordinate system of the image input unit 251 provided in the head unit 203 at times when the image data including the color image, parallax image from the stereo camera, etc. have been captured. In this case, the stereo vision system 2 in this embodiment derives a homogeneous transformation matrix etc. of the camera coordinate system from the robot-enter coordinate system and outputs, to the plane detection unit 3, a range image formed from homogeneous transformation matrix and corresponding three-dimensional distance data.

The plane detection apparatus according to this embodiment detects a dominant plane included in the acquired image by the aforementioned Hough transformation, and also detects a plane by the scan line growing to detect a plane even in case the image includes a plurality of planes such as stairs. At this time, the plane detection apparatus can acquire results of detection robust against measuring noises by generating lines correspondingly to the distribution of distance data points. In the following, there will be explained the detection of stairs ST covered by the field of view by the robot apparatus having installed therein the plane detection apparatus according to this embodiment.

Figure 12A:
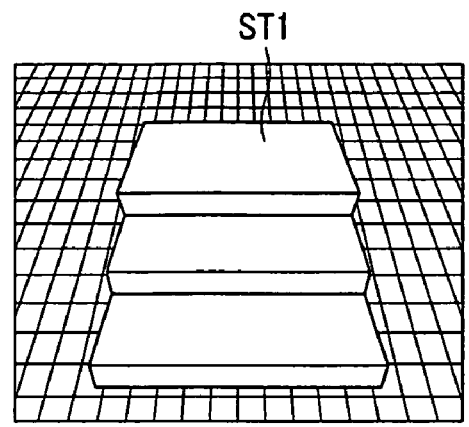
FIG. 12A is a front view of the stairs.
Figure 12B:
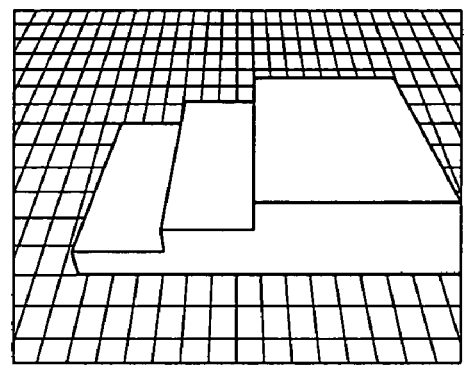
FIG. 12B is a side elevation of the stairs and FIG. 12C is a perspective view of the stairs.
Figure 12C:
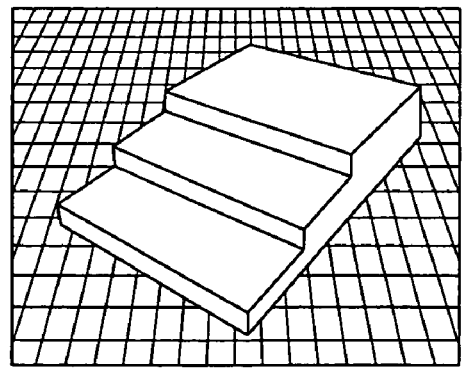
Figure 13A:
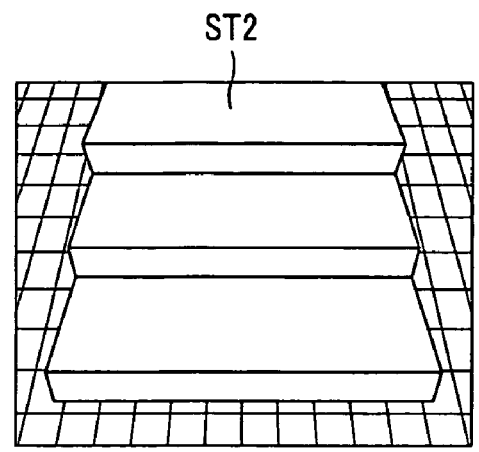
FIG. 13A is a front view of the stairs.
Figure 13B:
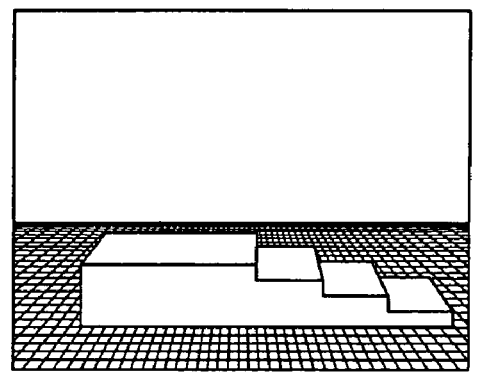
FIG. 13B is a side elevation of the stairs and FIG. 13C is a perspective view of the stairs.
Figure 13C:
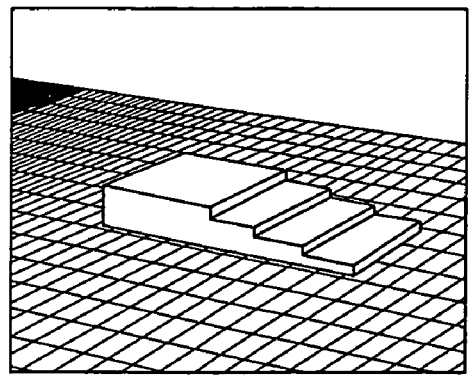

The robot apparatus 201 extracts stairs as shown in FIGS. 12 and 13 in the environment around itself, for example. FIGS. 12A and 13A are front views of the stairs, FIGS. 12B and 13B are side elevations of the stairs, and FIGS. 12C and 13C are perspective views of the stairs.

Note here that a plane or surface on which the human being, robot apparatus or the like steps when climbing stairs (on which the feet or moving legs are placed) is called "tread" and the height from one tread to a next tread (one step height) is called "riser". Also it should be noted that in the following, the stairs will be counted as one step, second step, . . . as the robot ascends the stairs from the level near the ground surface.

In stairs ST1 in FIG. 12, three steps are included, the riser is 4 cm high, the first and second treads are 30 cm wide and 10 cm deep, and only the topmost (third) tread is 30 cm wide and 21 cm deep. Also in stairs ST2 shown in FIG. 13, three steps are included, the riser is 3 cm high, the first and second treads are 33 cm wide and 12 cm deep, and only the topmost (third tread) is 33 cm wide and 32 cm deep.

Figure 14A:
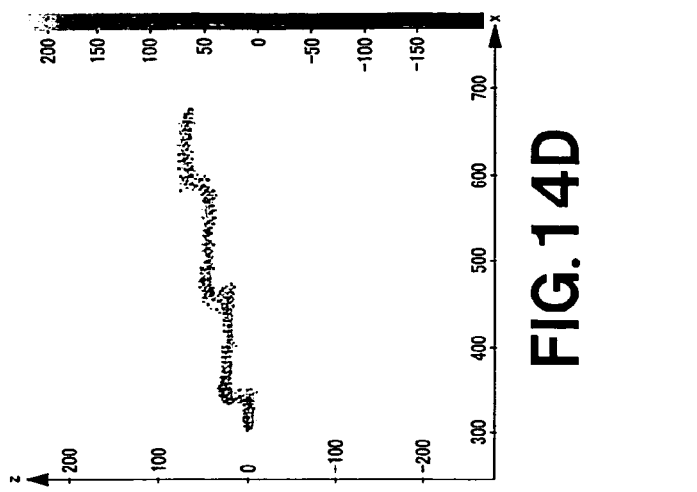
FIG. 14A schematically illustrates an image of the stairs in FIG. 13 captured from the front by a stereo vision system and FIGS. 14B to 14D show three-dimensional distance data taken from the image shown in FIG. 14A.
Figure 14B:
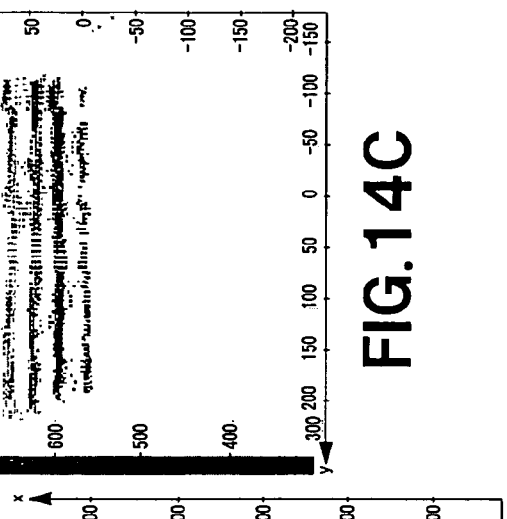
Figure 14C:
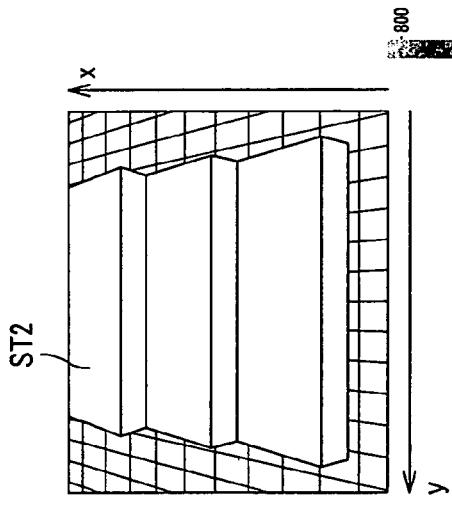
Figure 14D:
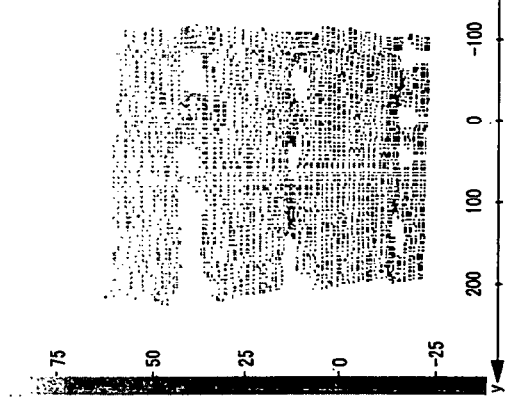
Figures 15A, 15B, 15C, 15D:
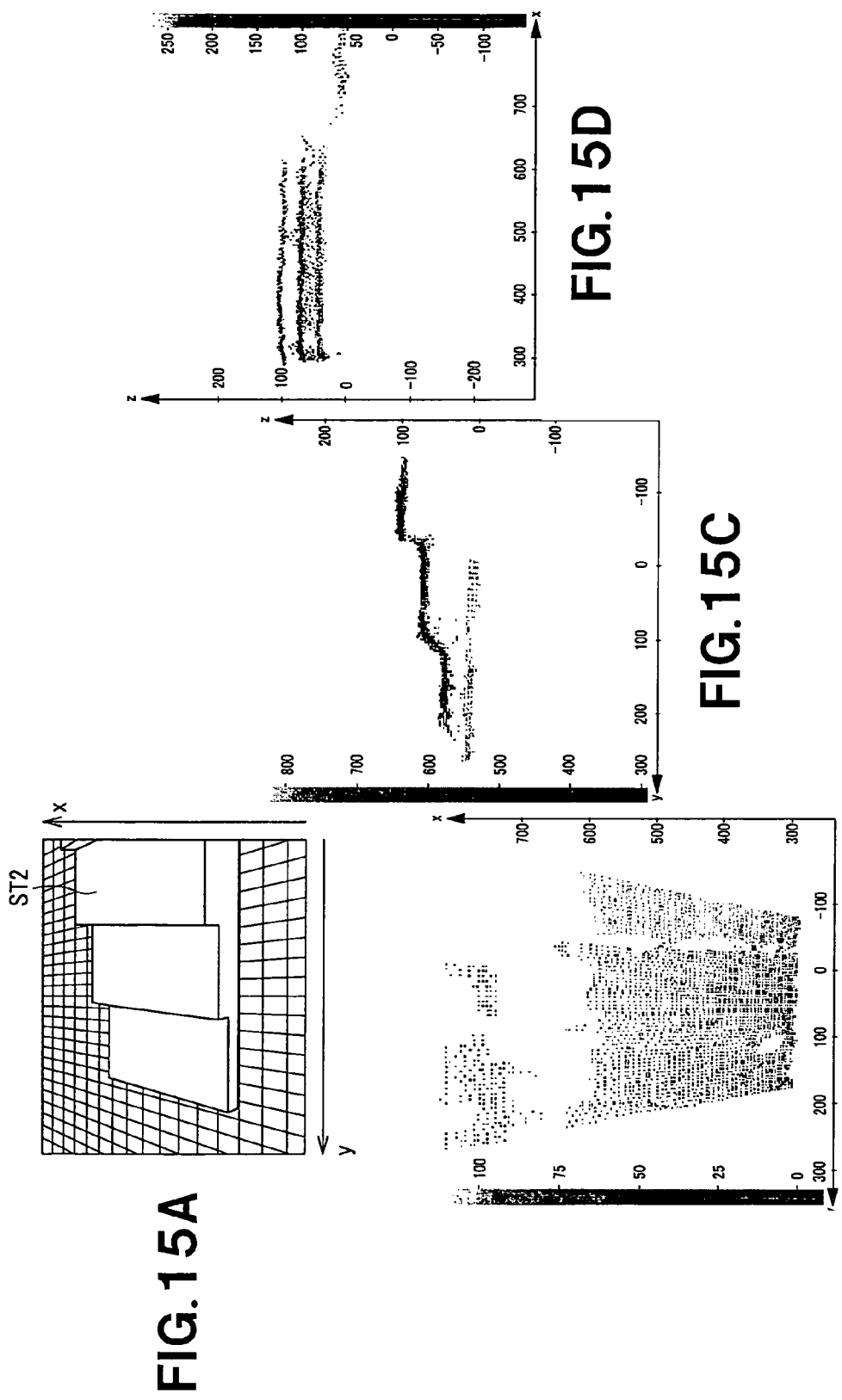
FIG. 15A schematically illustrates an image of the stairs in FIG. 13 captured from the lateral side by a stereo vision system and FIGS. 15B to 15D show three-dimensional distance data taken from the image shown in FIG. 15A.

FIGS. 14 to 16 shows the stairs ST2 shown in FIG. 13. FIGS. 14A to 16A are schematic illustrations of images captured from the front, lateral side and oblique front, respectively, by the stereo vision system, and FIGS. 14B and 14C to 16B and 16C show three-dimensional distance data acquired from the images shown in FIGS. 14A to 16A.

In case the stairs ST2 are captured from the front as shown in FIG. 14A, the three-dimensional distance data will be as shown in FIGS. 14B and 14C. In FIG. 14B, the horizontal axis is taken as y-direction, vertical axis is as x-direction and the dimension in the z-axial direction (height direction) is indicated with a density level which becomes more approximate to white as the height is larger with the landing surface of the robot apparatus 201 being taken as zero density (0). That is, data points whose density scale is similar are at the same height. As will be seen in FIG. 14B, the density of the data points of regions corresponding to the treads of the stairs ST2 is lower at the second tread than at the first tread, and lower at the third tread than at the second tread. Also, a nearly trapezoidal region in which the distance data is shown is a range (field of view) that can be captured by the robot apparatus. As shown in FIG. 14B, the distance data points are shown with about four levels of density, and the region shortest in the z-direction and having the highest density corresponds to the floor. In FIG. 14C, the horizontal axis is taken as y-direction, vertical axis is as z-direction and x-direction is indicated with a density. In this drawing, the density is lower as the x-directional distance is larger. In FIG. 14D, the horizontal axis is taken as x-direction, vertical axis is as z-direction and y-direction is indicated with a density corresponding to its distance.

Also, in case the robot apparatus 201 captures the lateral side of the stairs ST2, data points existing in an upper region whose x-axis is long has a similar density as that when the height is zero as shown in FIG. 15. FIG. 15 shows the result of measurement of the floor behind the stairs ST2. In an image obliquely captured as shown in FIG. 16, four regions indicating the floor and first to third treads are shown with different densities corresponding to their differences in height. As seen, these regions can be clearly distinguished from each other.

To acquire such three-dimensional distance data by means of the stereo camera, the stair ST2 should have a texture on the surface thereof. That is, since a parallax between two cameras is utilized to image a stair, if an object stair has no texture thereon, no parallax can be calculated and no accurate distance can be measured. Namely, the accuracy of distance data measurement by the stereo vision system depends upon a texture on an object stair. It should be noted that the "parallax" indicates a difference between images of a point in a space, formed on the left and right cameras (eyes), and varies depending upon the distance of the point from the cameras.

Figure 17:
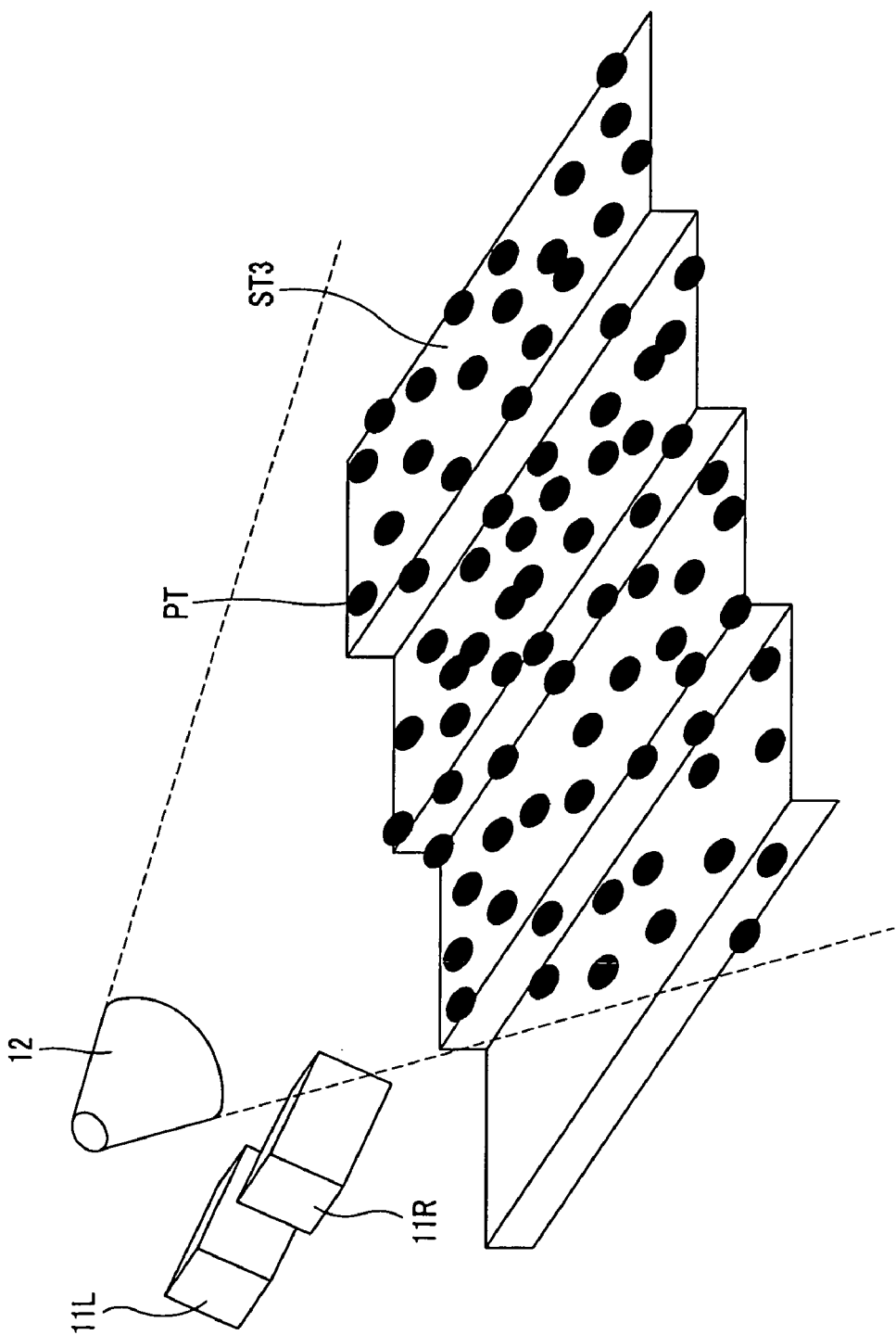
FIG. 17 explains the robot apparatus including a means for imparting a texture.

As shown in FIG. 17, stereo cameras 11R and 11L forming the stereo vision system are provided in the head unit of the robot apparatus, and a light source 12 to emit infrared light, for example, is provided in the head unit. The light source 12 emits light to a stair ST3 having no texture on it or other object such as a thing having no texture or an insufficient texture or a wall to impart a random pattern PT. It should be noted that the means for imparting such a random pattern PT is not limited to any light source to emit infrared light if it can form such a random pattern PT to provide a range image but the robot apparatus itself may impart a texture on an object. However, the infrared light can impart a pattern which the human eyes cannot recognize but can be viewed by the CCD cameras or the like installed in the robot apparatus.

Figure 18:
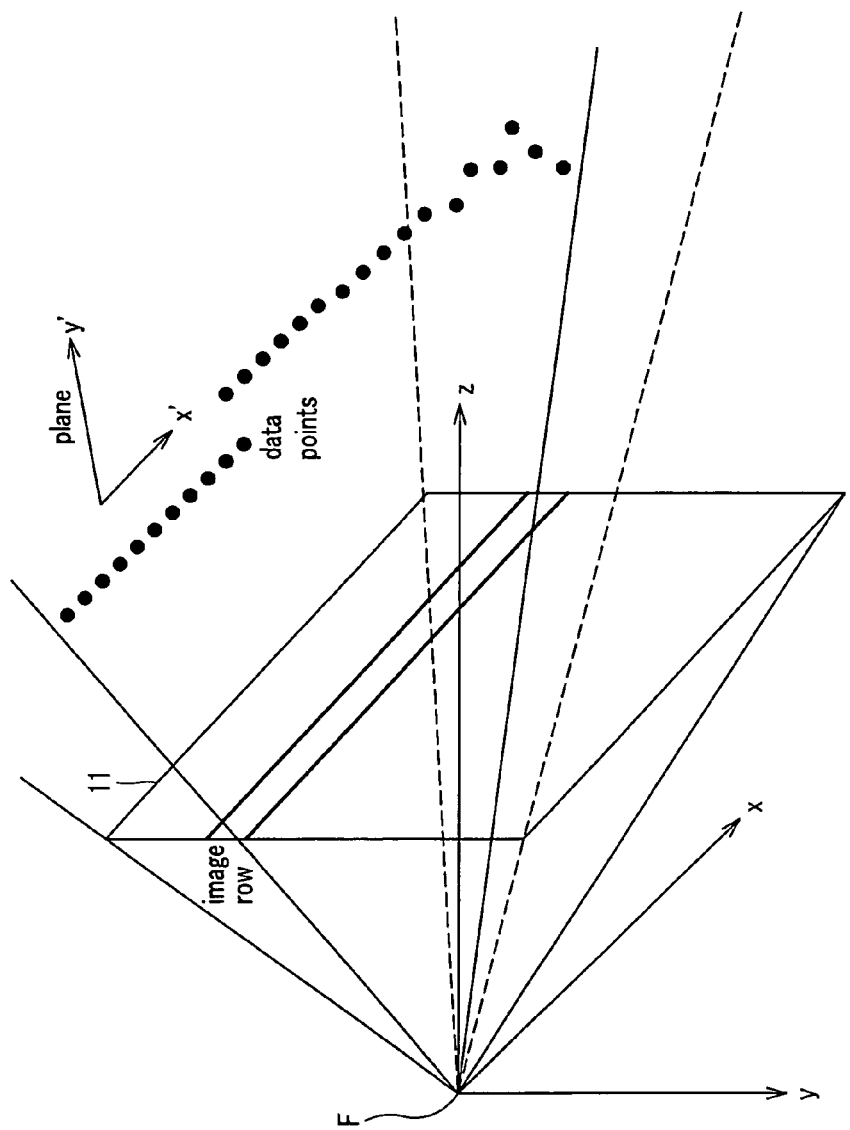
FIG. 18 explains how to extract planes by the scan line grouping method in this embodiment.

Next, the plane detection unit 3 included in the plane detection apparatus 1 will be explained. The plane detection unit 3 detects planes using the scan line grouping method in the embodiment of the present invention shown in FIG. 18. In the scan line grouping method, an image 11 captured from a focus F is first processed along the line- or column-direction as shown in FIG. 18. Based on the fact that in a line-directional image train (image row), distance data points in one plane will form a straight line, there is generated a line including distance data points estimated to be in one plane. Namely, the scan line grouping method is to estimate and detect a plane in a group of a plurality of thus acquired lines on the basis of the line groups determined to be in one plane.

Figure 19:
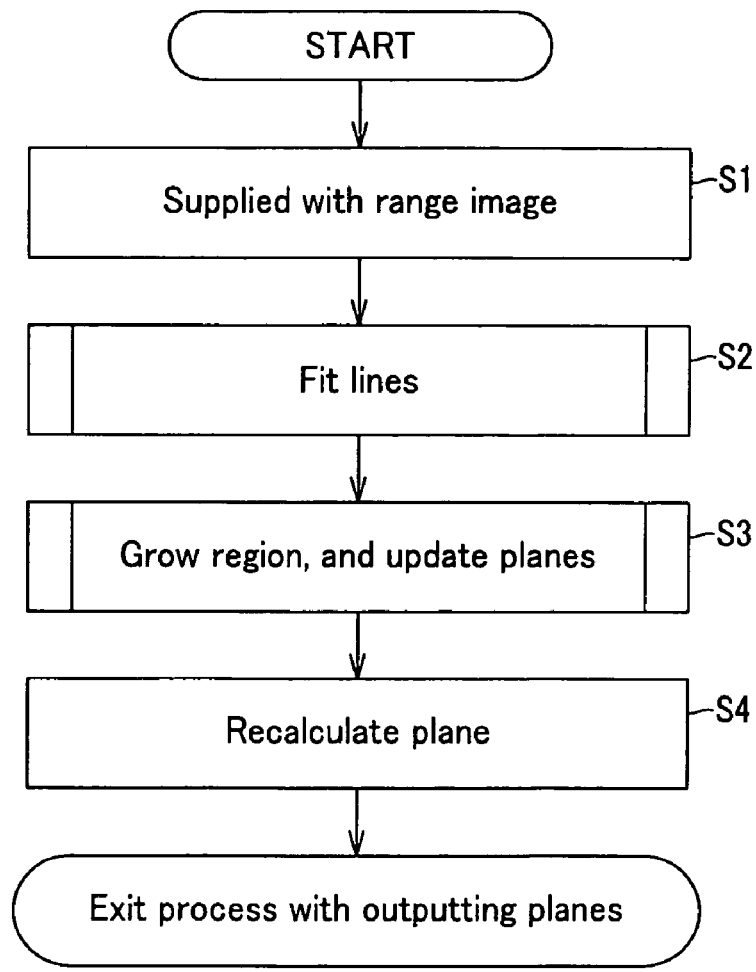
FIG. 19 shows a flow of operations made in the plane detection by the scan line grouping method.

FIG. 19 shows a flow of operations made in the plane detection by the scan line grouping method. As shown in FIG. 19, the plane detection unit 3 is first supplied with a range image in step S1. Then in step S2, the plane detection unit 3 determines lines from data points in each line- or column-directional image train in the range image, estimated to be in one plane. It extracts lines estimated to be in one plane from the line group to determine a plane including the lines in step S3. In step S3, a region which is to be the seed of the plane is selected. This selection is made under the condition that three lines including one of vertically adjacent lines (or horizontally adjacent columns) should be in one plane. The plane in which the seed region defined by the selected three lines is taken as a reference plane, and a plane is determined by averaging the three lines. Also, a region defined by three lines is taken as a reference planar region.

Then, the plane detection unit 3 compares, in clearance, the straight line including the line- or column-directional image trains adjacent to the selected seed region and the reference plane to judge whether they are in one plane. If they are determined to belong to the same plane, the plane detection unit 3 adds the adjacent line to the reference plane area (region growing), updates the reference plane as a plane including the added line (plane updating), and repeats these operations until no more lines in one plane exist in the data train adjacent to the planar region. Then, it searches seed regions, and repeats the plane updating and region growing until no seed region (three lines) exist. Finally, the plane detection unit 3 couples ones of the thus acquired region groups, which form together the same plane. In this embodiment, there is provided step S4 in which there will be done a plane recalculation to determine a plane again by calculating the line groups in the acquired plane except for ones more than a predetermined threshold off the plane. The plane thus determined is taken as a final one. This will be described in further detail later.

Note here that the process to detect lines from the three-dimensional distance data and take, as one plane, a region collecting the lines per each same plane is the plane detection by the conventional scan line grouping method. However, the line fitting method in step S2 in this embodiment is different from the conventional one. That is, even when it is intended to generate lines fitting the distance data points as much as possible by determining the lines from the distance data points as above, problems such as over-segmentation and under-segmentation will arise unless the threshold is changed correspondingly to the accuracy of the distance data. On this account, a method of changing the threshold adaptively to the accuracy of distance data and noises is introduced into the line fitting in this embodiment.

The plane detection by the scan line grouping method will be described in further detail with reference to FIG. 19. The plane detection unit 3 includes a line fitting block 4 which is supplied with three-dimensional range image from the stereo vision system 2 and detects lines estimated to be in one plane in a three-dimensional space. To avoid the problem such as the over-segmentation or under-segmentation, that is, recognition of a plurality of planes as a single plane or recognition of a single plane as a plurality of planes, an algorithm (adaptive line fitting) is introduced to fit lines adaptively to the distribution of data points. The adaptive line fitting is such that the line fitting block 4 first extracts a line as a first one with a relatively large threshold and then analyzes the distribution of the data point groups forming a line, as a second one, determined by the least squares method which will be described in detail later on the basis of the extracted first line. That is to say, it is roughly estimated whether the data point groups are in one plane, to thereby extract the data point groups, and it is analyzed whether the data points are unevenly distributed in the extracted data point groups, to thereby re-estimate whether the data point groups are in one plane.

This embodiment uses an algorithm in which when the result of the data point distribution analysis is such that the data point groups are in a zig-zag shape which will be described in detail later, it is determined that the distribution is uneven, and the data point groups are segmented, and these operations are repeatedly done to extract lines adaptively to noises included in the data point group.

Figure 20:
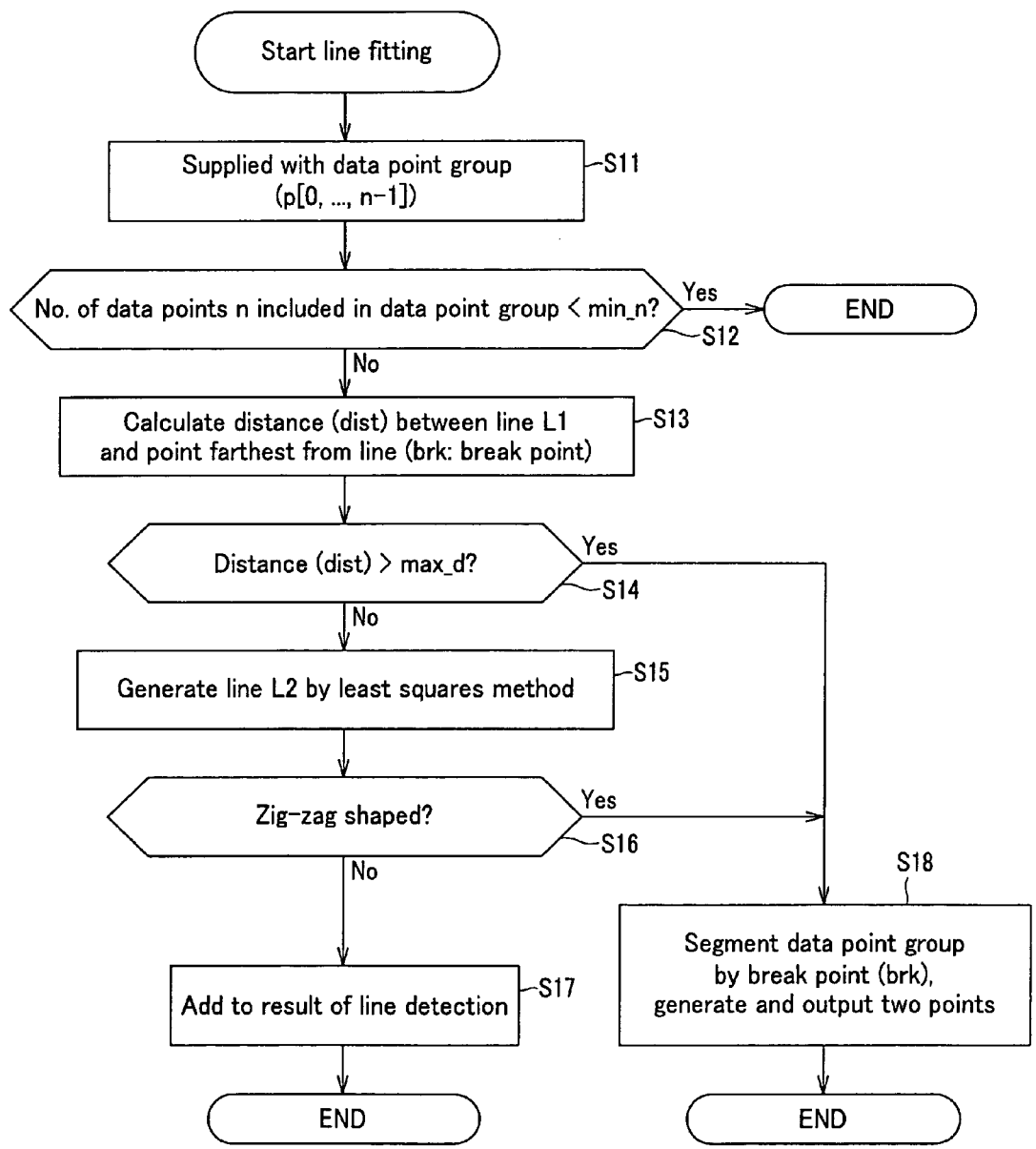
FIG. 20 shows a flow of operations made in the line fitting block used in this embodiment.

FIG. 20 shows a flow of operations made in the line fitting block 4, namely, it shows the operations in step S2 in FIG. 19 in detail. First, the line fitting block 4 is supplied with distance data. It extracts a group of data points estimated to be in one plane in the three-dimensional space in the line-directional image trains (data point train), for example, of the supplied distance data. The group of data points estimated to be in one plane in the three-dimensional space may be a set of data points whose mutual distance in the three-dimensional space is less than a predetermined threshold, for example, 6 cm, and is extracted as a data point group (P[0, . . . , n−1]) in step S11. Then, it is checked whether the number of samples n included in the data point group (P[0, . . . , n−1]) is larger than a minimum necessary number of samples min_n (in step S12). When the number of samples n is smaller than the minimum necessary number min_n (Yes in step S2), the process is ended with outputting an empty set as the result of detection.

On the other hand, when the number of samples n is larger than the minimum necessary number min_n (No in step S2), a line (chord) L1 connecting one end P[0] of the data point group (P[0, . . . , n−1]) and other end P[n−1] is generated as a first line. Then, a data point whose distance from the line L1 is searched as a point of interest brk from the data point group (P [0, . . . , n−1]), and the distance dist is calculated (in step S13). If the maximum distance dist is larger than a threshold max_d for segmentation of the data point group (Yes in step S14), the data point group P[0, . . . , n−1] is segmented by the point of interest (break point) brk into two data point groups P[0, . . . , brk] and P[brk, . . . , n−1] (in step S18).

On the other hand, if the maximum distance dist is smaller than the threshold max_d for segmentation of the data point group (No in step S14), the least squares method which will be described in detail later is used to determine an optimum-line equation line from the data point group (P[0, . . . , n−1])

(in step S15) and a line L2 defined by the equation line is generated as a second line. Then, it is examined in step S16 whether the data point groups (P[0, . . . , n−1]) are in a zig-zag shape in relation to the line L2. When the data point groups (P[0, . . . , n−1]) are not in the zig-zag shape (No in step S16), the process is ended with adding the determined line equation line to a line-extraction results list (in step S17).

If it has been determined in step S16 that the line determined in step S15 is in the zig-zag shape (Yes in step S16), the line fitting block 4 goes to step S18 as in step S14, and will segment the data point group by the point of interest brk whose distance dist has been determined in step S13 into two data points P[0, . . . , brk] and P[brk, . . . , n−1]. If the two data point groups are acquired in step S18, the line fitting block 4 will recursively process the two data point groups by making the operations in step S11 and subsequent steps. The line fitting block 4 will repeat the operations until all the data point groups will not be segmented any more, that is, until all the data point groups have been processed through step S17, whereby a line-extraction results list having all the lines registered there is provided. With such operations, the influence of noises can be removed from the data point group P[0, . . . , n−1] to accurately extract a group of lines.

Note that although it has been described above that the line L1 connecting the end points of the data point group P[0, . . . , n−1] is generated in step S13, the line L1 may be determined by the least-squares method from the data point group P[0, . . . , n−1] correspondingly to the distribution and nature, for example, of the data point group P[0, . . . , n−1]. Also, although the point of interest brk is taken as a point whose distance to the line L1 connecting the end points in this embodiment, it is a point whose distance to a line determined by the least-squares method as above is largest. However, in case a point whose distance to a line determined by the least-squares method is largest is taken as the point of interest brk or in case there is a plurality of points whose such distance is larger than the threshold max_d for segmentation of the data point group, the data point group P[0, . . . , n−1] may be segmented by all such points or by more than one selected from the points.

Next, the least-squares line fitting by the least-squares method (least-squares line fitting) as in step S15 will be described. There will be explained a method of determining an equation for a line most fit to the data point groups when n data point groups P[0, . . . , n−1] are given. A model of the line equation is given by the following equation (1):

$$x \cos \alpha 30 \, y \sin \alpha + d = 0 \quad (1)$$

In this case, the sum of differences between a line equation model and data points at one point $(x_i, y_i)$ of n data point groups P[0, . . . , n−1] can be given by the following equation (2):

$$E_{fit} = \sum_i (x_i \cos\alpha + y_i \sin\alpha + d)^2 \quad (2)$$

A straight line most fit to the data point groups can be determined by minimizing the sum of the differences given by the above equation (2). The terms α and d for minimizing the equation (2) can be determined as given by the following expression (3) using a mean value and variance-covariance matrix of the data point groups P:

$$\alpha = \frac{1}{2}\tan^{-1}\frac{-2S_{xy}}{S_{y2} - S_{x2}}, \, d = -(\bar{x}\cos\alpha + \bar{y}\sin\alpha) \quad (3)$$

where $$\bar{x} = \frac{1}{n}\sum_i x_i \qquad \bar{y} = \frac{1}{n}\sum_i y_i$$

$$S_{x2} = \sum_i (x_i - \bar{x})^2 \qquad S_{y2} = \sum_i (y_i - \bar{y})^2$$

$$S_{xy} = \sum_i (x_i - \bar{x})(y_i - \bar{y})$$

Figure 21:
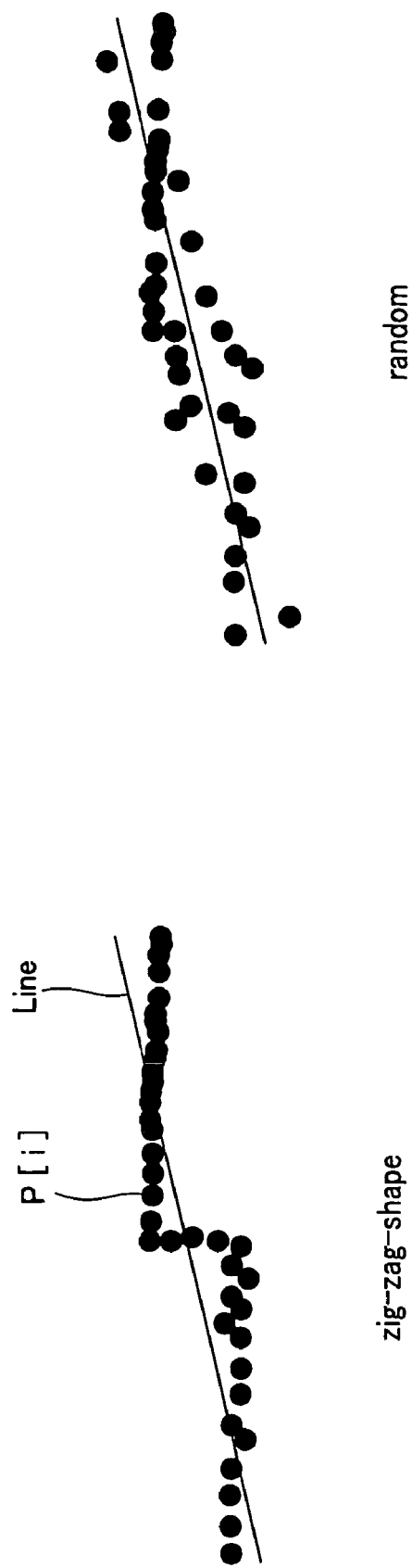
Figure 22:
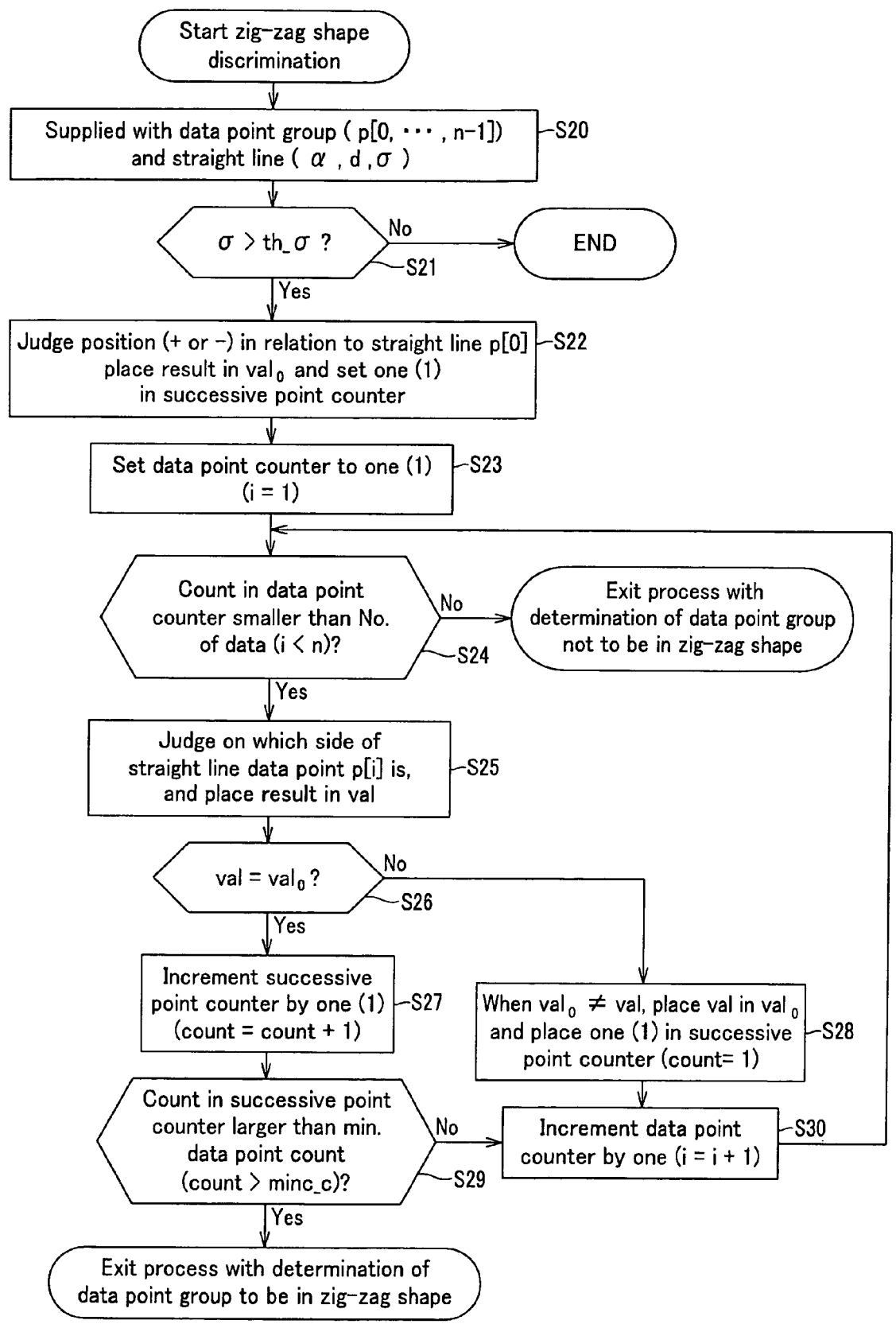
FIG. 22 shows a flow of operations made in the zig-zag shape discrimination method in the embodiment.

Next, the zig-zag shape discrimination effected in step S16 will be explained. In this zig-zag shape discrimination method, when n data point groups P[0, . . . , n−1], straight line Line (α, d) and x cos α+y cos α+d=0 are given, it is discriminated whether the data point groups P[0, . . . , n−1] intersect the straight line Line as shown in FIG. 21A or whether the data points are evenly distributed under the influence of noises for example, as shown in FIG. 21B. Basically, the data point groups P[1, . . . , n−1] appearing successively on the straight line Line is counted. When a larger number of data point groups P[0, . . . , n−1] than a specific number appear successively, it can be determined the data point groups form a zig-zag shape. In case the data point groups intersect the straight line Line as in FIG. 21A, the data point group P[i] have to be segmented for determination of a straight line Line more fit to the data point groups P[0, . . . , n−1]. FIG. 22 shows a flow of operations made in the zig-zag shape discrimination method.

First, the line fitting block 4 is supplied with the data point groups P[0, . . . , n−1] and straight line Line (α, d, σ) in step S20. The "a" indicates a standard deviation of the point train. Next, the line fitting block 4 judges whether the standard deviation σ is larger than a threshold th_σ. If the standard deviation σ is smaller the threshold th_σ (No in step S21), the line fitting block 4 terminates the judgment in order to avoid the influence caused by the detection of a floating point calculation error of the CPU. The discrimination is continuously done only when the standard deviation σ is larger than the threshold th_σ. Next, the line fitting block 4 judges, based on sing (sdist(P[0])), on which side of the straight line there is the first data point P[0] of the data point groups P[0, . . . , n−1], places the result of judgment in Val$_0$ and sets the count of a counter which counts successive data point groups on the same side as Val$_0$ (which counter will be referred to as "successive point counter; the count of this counter will be referred to as "count" hereunder) to one (1) in step S22. It should be noted that "sign(x)" is a function to repeat the sign (+ or −) of the value of "x", and "sdist(i)" indicates a positive or negative distance from the i-th data point in the straight line Line determined by calculation of P[i].x cos α+P[i].y cos α+d. That is, a sign "+" or "−" is placed in Val$_0$ depending upon the side of the line Line on which the data point P[0] is.

Next, a counter to count data points (will be referred to as "data point counter" hereunder; count of this data point counter be referred to as "count i" hereunder) is set to "1" (count "i") in step S23. When the count i of the data point counter is smaller than the number of data n (Yes in step S24), the line fitting block 4 judges, based on sing(sdist(P[i])), on which side of the straight line the data point P[i] on which a next data (will be referred to as "i-th data" hereunder) is, and places the result of judgment in Val (in step S25). Then, the line fitting block 4 compares $Val_0$ determined in step S22 and Val determined in step S25. When $Val_0$ and Val are difference from each other (No in step S26), the line fitting block 4 places Val in $Val_0$, places "1" in the count count of the successive point counter (in step S28), increments the count "i" of the data point counter (in step S30) and then repeats the operations in step S24 and subsequent steps.

On the other hand, when $Val_0$ and Val are equal to each other (Yes in step S26), the line fitting block 4 determines that the data points P[i−1] and P[i] are on the same side of the straight line Line and increments the count count of the data point counter by one (1) in step S27. Further, the line fitting block 4 judges whether the count count of the successive point counter is larger than the minimum data point count min_c for determination of the data point groups to be in the zig-zag shape (in step S29). When the counter is larger than the minimum data point count min_c (Yes in step S29), the line fitting block 4 determines the data point groups to be in the zig-zag shape, and exits the process with outputting a signal TRUE. On the other hand, when the count count of the successive point counter is smaller than the minimum data point count min_c (No in step S29), the line fitting block 4 goes to step S30 where it will increment the count i of the data point counter (in step S30), and repeats the operations in step S24 and subsequent steps.

Then, the line fitting block 4 repeats the operations in step S24 and subsequent steps until the count i of the data point counter reaches the data number n, and it will exit the process with outputting a signal FALSE when a state of count i≧n.

When n data point groups $P[0, \ldots, n-1]$ and straight line Line $(\alpha, d)$: $x \cos \alpha + y \cos \alpha + d = 0$ are given, the line fitting block 4 can judge whether the group of data point group intersects the straight line Line in a zig-zag shape. Thus, the line fitting block 4 can judge in step S16 whether the data point groups should be segmented. When the line fitting block 4 has determined that the group of data point group intersects the straight line determined by the least-squares method in the zig-zag shape, it determines that the data point groups should be segmented, and will go to step S18 where it will be able to segment the data point groups by the point of interest brk as a break point. It should be noted that the operations made in steps S21 and S30 may be expressed as in FIG. 23.

Figure 24:
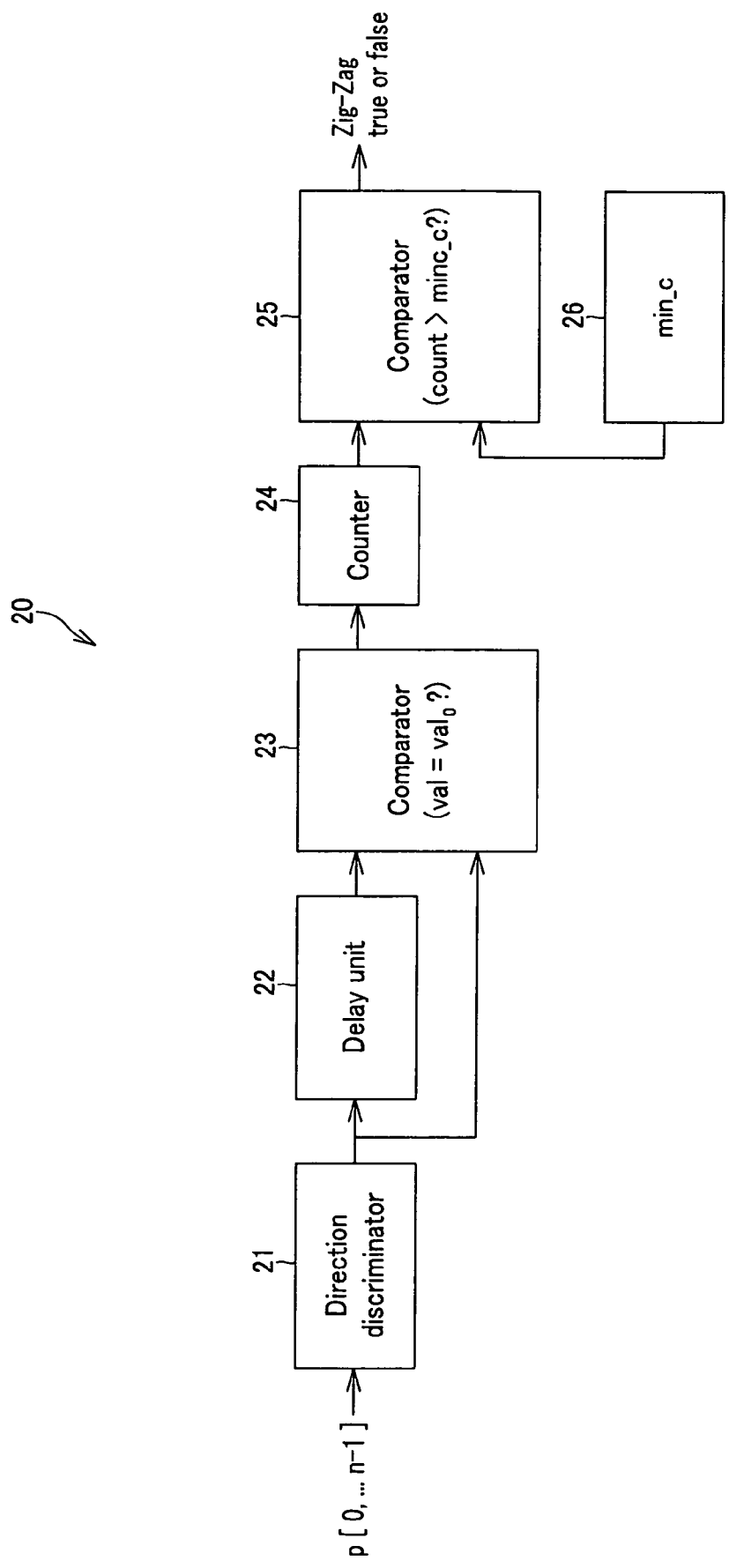
FIG. 24 is a block diagram of the zig-zag shape discriminator.

Also, the zig-zag shape discrimination can be effected by hardware as well as the CPU. FIG. 24 is a block diagram of a zig-zag shape discriminator. As shown in FIG. 24, the zig-zag shape discriminator, generally indicated with a reference numeral 20, includes a direction discriminator 21 which is supplied with n data point groups $P[0, \ldots, n-1]$, judges on which side of the straight line Line each of the data point P[i] is and outputs the result of judgment Val, a delay unit 22 for comparison of the data one after each data point P[i] with the result of judgment from the direction discriminator 21, a comparator 23 to compare the result of direction discrimination Val at the data point P[i] and result of direction discrimination $Val_0$ at the data point P[i−1], a successive point counter 24 to increment the count when the comparator 23 provides a result that $Val=Val_0$, and a comparator 25 to compare the count count of the successive pint counter 24 with the minimum data point count min_c read from a minimum data point count storage unit 26.

The zig-zag shape discriminator 20 constructed as above functions as will be described below. The direction discriminator 21 determines a straight line Line by the least-squares method from the data point groups $P[0, \ldots, n-1]$, determines a positive or negative distance between each data point P[i] and straight line Line and outputs the sign, positive or negative of the distance. When supplied with the positive or negative sign of the distance from the data point [i−1] to the straight line Line, the delay unit 22 stores the data until it is supplied with the positive or negative sign of the data point P[i] one after the data point P[i−1].

The comparator 23 compares the sign, positive or negative, of the data point P[i] and that of the data point P[i−1]. When the signs are the same, the comparator 23 will output a signal for incrementing the count count of the successive point counter 24. When the signs are different from each other, the comparator 23 will output a signal for placing one (1) in the count count of the successive point counter 24. The comparator 25 compares the count count and minimum data point count min_c. When the minimum data point count min_c is larger than the count count, the comparator 25 will output a signal indicating that the data point groups $P[0, \ldots, n-1]$ are in a zig-zag shape.

Next, the region growing block 5 shown in FIG. 10 will be explained. The region growing block 5 is supplied with line groups determined by the line fitting block 4, judges, by fitting the point train to a plane (plane fitting) in which plane each of the lines is, and separates a region formed from the supplied line groups into a plurality of planes (planar regions). For the separation of a region into a plurality of planes, the following technique is adopted.

First, the region growing block 5 searches the supplied line groups for three adjacent lines estimated to be in one plane. A plane determined based on these three lines (reference plane) is the seed of planes. A region including the three lines is called "seed region". The region growing block 5 judges, by the plane fitting, whether the lines adjacent to the seed region are included coplanar with the reference plane. When the lines adjacent to the seed region are included in one plane, the region growing block 5 will add the lines as region-growing lines to the seed region to grow the region, while recalculating the reference-plane equation for the region-growing lines as well. With the above operations, all the lines are distributed in a region (plane).

Figure 25:
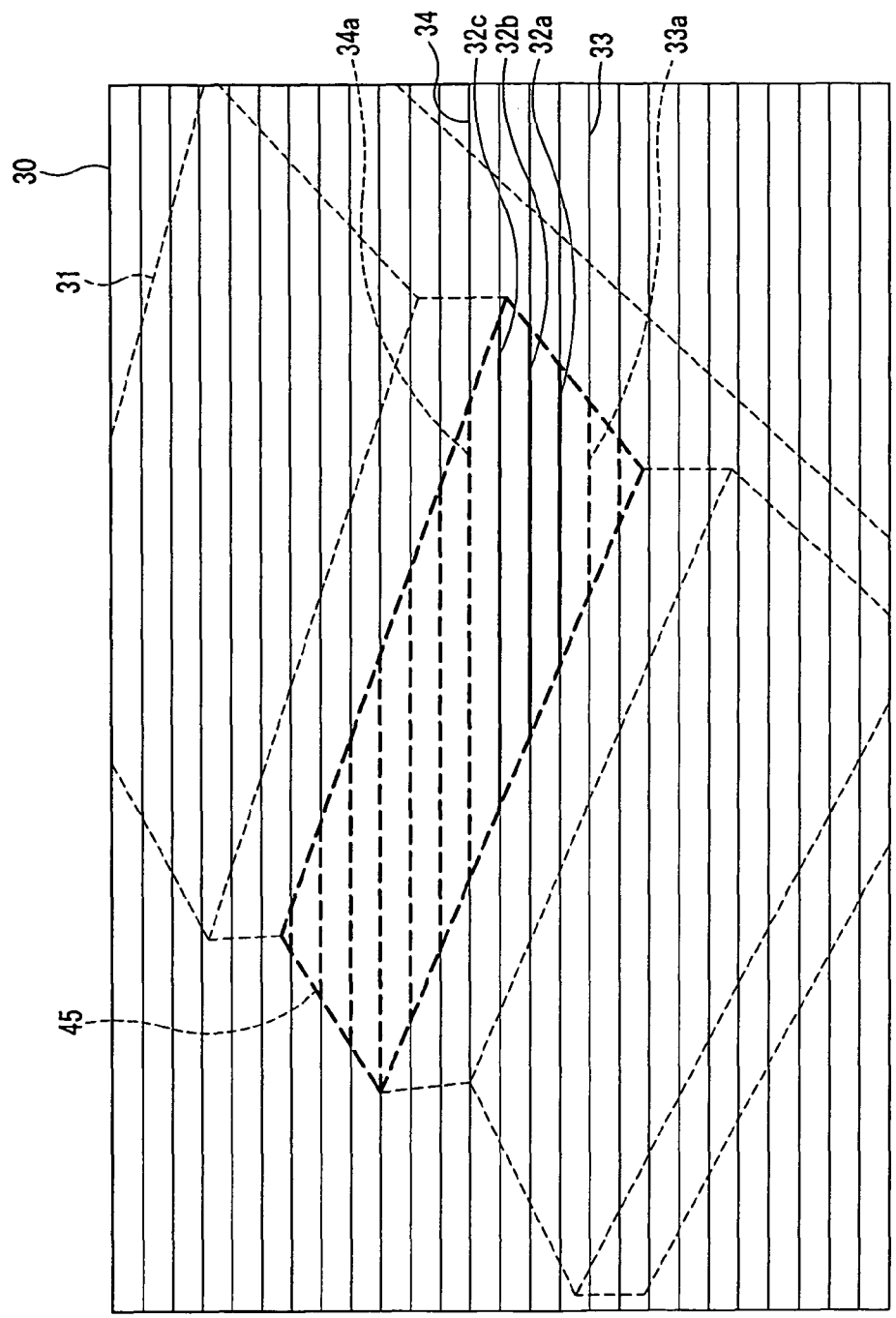
FIG. 25 is a schematic illustration for explaining the region growing in this embodiment.

FIG. 25 is a schematic illustration for explaining the region growing. When stairs 31 defined by a plurality of planes exist in an image 30 As shown in FIG. 25, it is meant that three lines 32a to 32c indicated each with a thick line, for example, have been selected. A region defined by these lines 32a to 32c is a seed region. First, one plane (reference plane) P is determined based on these three lines 32a to 32c. Next, lines lying coplanar with the plane P are selected based on a data train 33 or 34 adjacent, outside the seed region, to the lines 32a to 32c lying at the outermost side of the seed region. It is assumed herein that a line 33a is selected. Then, a plane P' including the group of these four lines is determined to update the reference plane P. Further, when a line 34a is selected, a plane P" including the group of these five lines is determined to update the plane P'. With these operations being repeatedly done, the second tread of the stairs 31 is determined as a plane 45 shown as enclosed with a dash line. Thus, the region growing process is effected until no further lines exist for addition to a selected seed region. When there is no further line, the image 30 is searched for three lines which are to form a seed region and the region growing process is repeated. With these operations being done repeatedly, the operation in step S3 in FIG. 19 is repeated until there are no further three lines for a seed region.

Next, there will be explained the plane fitting technique for estimation of a plane equation formed from the group of data points $P[0, \ldots, n-1]$, the seed region selecting technique for selection of a seed region on the basis of the estimated plane equation, region growing technique for making a seed region larger, and the post-processing technique for recalculating regions except for those having large errors on the basis of the estimated plane equation.

The point P in a three-dimensional space is given by P=($x_i$, $y_i$, $z_i$), and the plane equation is expressed with its normal vectors n(nx, ny, nz) and a non-negative constant d as given by the following equation (4):

$$xn_x+yn_y+zn_z+d=0 \qquad (4)$$

Note that a plane passing through a focus of a stereo camera cannot be viewed by the stereo camera as shown in FIG. 11. That is to say, since the plane does not pass by the focus, the term "d" in the above equation (4) may be d≠0. Therefore, the least-squares method can be used to determine the plane as a value which minimizes the value as given by the following equation (5):

$$fit(n, d) = \sum_i (p_i^T n + d)^2 \; . \qquad (5)$$

The optimal solution is determined as n=m/∥m∥ and d=−/∥m∥ where ∥·∥ is a vector value and m is a solution of a linear system easily obtainable as given by the following equation (6-1) using the Cramer's rule which is to solve the simultaneous equation by a determinant:

$$A \cdot m = b \qquad (6\text{-}1)$$

where $$A = \sum_i p_i p_i^T, \; b = \sum_i p_i \qquad (6\text{-}2)$$

Even if new data points have been added or data points have been deleted, the above solution permits to recalculate the plane parameters just by updating the values A and b in the equation (6-2). Further, in the line fitting in this embodiment, two moments (primary moment: average; geometrical moment: variance) E(p) and E($pp^T$) of the group of n data points are already known, and they can be used to update the values A and b as in the following expression (7) for use in plane updating of the group of n data points:

$$A \leftarrow A + nE(pp^T), \; b \leftarrow b + nE(p) \qquad (7)$$

Also, once the parameters n and d of a plane are calculated, the root mean square (RMS) residual of the plane equation indicating the extent of deviation of the group of n data points from the plane equation (will be referred to as "rms" hereunder) can be calculated using the following equation (8). Also in this case, the two moments of the n data points can be used to calculate the following equation (8):

$$rms(p_1 \cdots p_n) = \sqrt{\frac{1}{n} \sum_i (p_i^T n + d)^2} > th\_rms \qquad (8)$$

As will be known from the above equation (8), when each data point is in a determined plane, the rms ($P_1, \ldots, P_n$) of the plane equation will be zero (0). If the value is smaller, it is meant that each data point is well fit to the plane.

Figure 26:
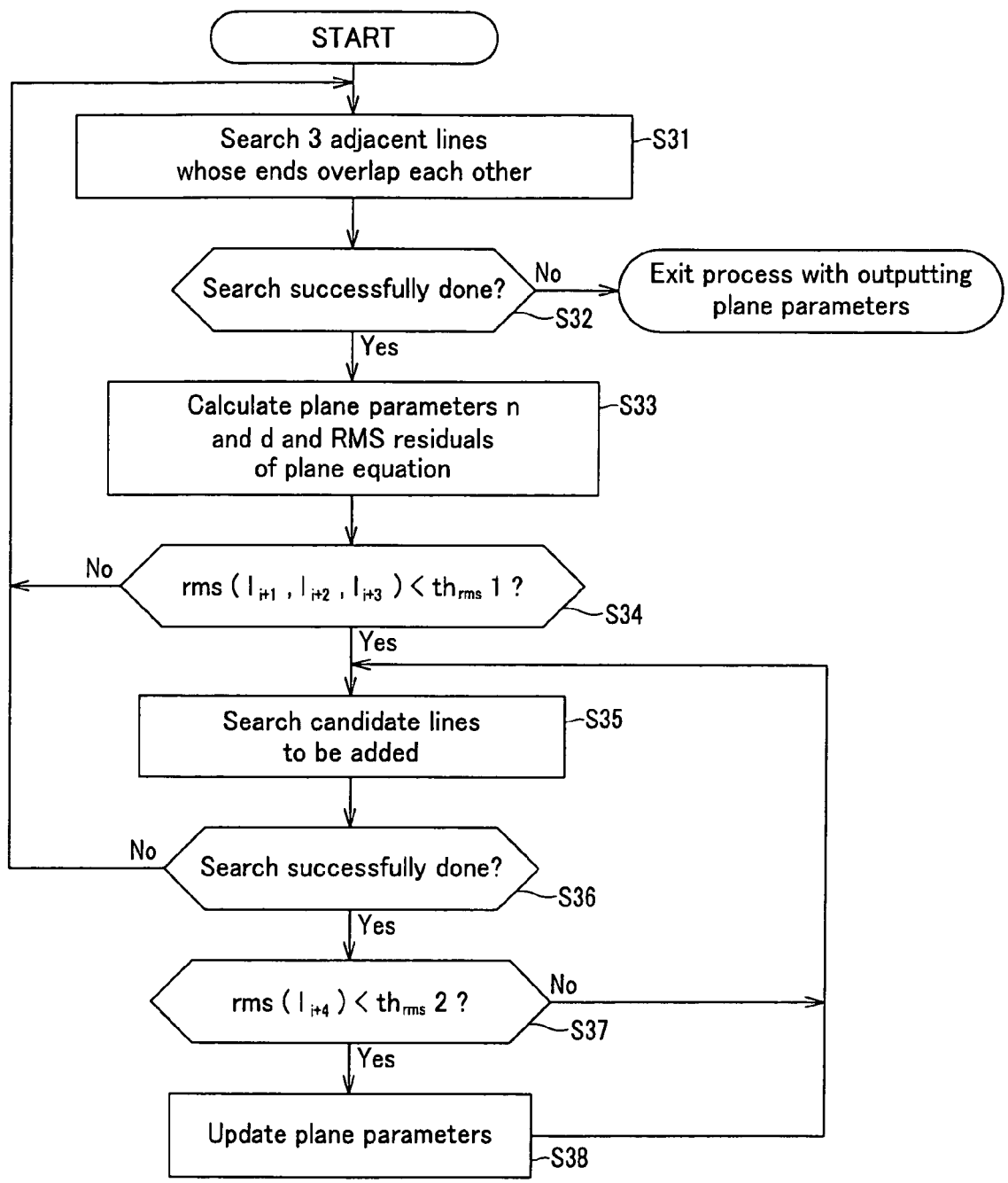
FIG. 26 shows a flow of operations made in seed-region search and region growing in the region grouping unit in this embodiment.

Next, there will be described the technique for searching a seed region and technique for making the seed region larger while updating a plane. FIG. 26 shows a flow of operations made in seed-region search and region growing processes. As shown in FIG. 26, to search a seed region, three lines 11, 12 and 13 to which the line- or column-directional data train having been used in the line fitting and whose pixel positions in the lines 11 and 12 and lines 12 and 13 overlap each other in a direction perpendicular to the data train are searched in step S31. Each of the data points has an index indicating a pixel position in an image. Lines in a line-directional data train, for example, are compared based on their own indexes to see whether they overlap each other in the direction of the data train. When such lines has successfully be found out (Yes in step S32), the above equation (7) is used to calculate the above equation (6-1). Thus, the plane parameters n and d can be determined, and they are used to calculate root mean square residuals ($l_1, l_2, l_3$) of the plane equation as given by the above equation (8) (in step S33). In case the root mean square residuals rms ($l_1, l_2, l_3$) of the plane equation is smaller than a predetermined threshold $th_{rms}1$ such as 1 cm, the three lines are selected as a seed region in step S34. When the root mean square residuals rms ($l_1, l_2, l_3$) of the plane equation is larger than the predetermined threshold $th_{rms}1$, the region growing block 5 returns to step S31 where it will search lines which meet the above requirements. Also, the lines selected as the seed region are excluded from the line groups list so that they will not be used in any other plane growing process or the like.

The seed region thus selected is made by the scan line grouping method to grow. That is, there are first searched lines which are candidate ones to be added to the seed region in step S35. It should be noted that this region includes a seed region already updated as well. The candidate lines are a line ($l_4$) adjacent to the line $l_1$, for example, included in the seed region. The pixel positions in these lines have to overlap each other as above. When such lines have successfully been searched (Yes in step S36), the root mean square residual rms ($l_4$) of the plane equation is calculated, and it is judged whether the rms is smaller than a predetermined threshold $th_{rms}2$ in step S37. When the rms ($l_4$) is smaller, the plane parameters are updated in step S38 and the operations in step S35 and subsequent steps are repeated. The operations are repeated until no further candidate lines exist. When there exist no further candidate lines (No in step S36), the region growing block 5 returns to step S31 and searches a seed region again. When no seed region is included in the line group (No in step S32), the region growing block 5 exits the process with outputting the plane parameters having so far been acquired.

In this embodiment, the above equation (8) is used for searching a seed region and judging whether three lines are in one plane and also used to judge, in growing the region, whether the lines are in the reference plane or a plane resulted from updating of the reference plane. More specifically, only when the root mean square residual rms of the plane equation is less than the predetermined threshold $th_{rms}1$, the lines (group) are estimated to be in one plane and a plane is recalculated as a plane including the lines. By judging, based on the root square mean residual rms of the plane equation, whether the lines are in one plane, a plane can accurately be extracted even when the plane includes small steps robust against noises. The reason will be explained below.

FIG. 27 schematically illustrates examples equal in distance between an end point and straight line to each other but different in root mean square residual rms of the plane equation from each other. In region growing with a straight line being coplanar with a plane P when the distance D between an end point of the straight line (line segment) of interest and the plane P is smaller than a predetermined threshold, a straight line La intersecting the plane P (as in FIG. 27A) and straight line Lb parallel with the plane P and a predetermined distance off the latter (as in FIG. 27B) will be used to update the plane P. The root mean square residual rms of the plane equation is determined. The root mean square residual rms (La) of the plane equation, determined based on the straight line La in FIG. 27A is smaller than the root mean square residual rms (Lb) of the plane equation, determined based on the straight line Lb in FIG. 27B. That is, as shown in FIG. 27A, when the straight line La and plane P intersect each other, the root mean square residual rms of the plane equation is relatively small and influenced by noises in many cases. On the other hand, as shown in FIG. 27B, the root mean square residual rms of the plane equation is large and it is highly probable that the straight line Lb is not coplanar with the plane P but with another plane P'. Therefore, in case it is necessary to accurately determine a plane from an environment including a plurality of planes, it will be preferable to calculate a root mean square residual rms of a plane equation and determine lines to be in one plane when the rms value is smaller than a predetermined threshold $th_{rms}2$ as in this embodiment.

It should be noted that when the distance between the end point of a line and a plane is smaller than a predetermined threshold, the line may be included in the plane as in the conventional technique. The former and latter techniques may be used in combination depending upon the environment and nature of distance data.

In searching an additional line for the aforementioned region growing, the threshold ($th_{rms}2$) used may be a constant acquired experimentally. However, since setting of any inappropriate threshold will cause the under-segmentation or over-segmentation, a threshold should desirably be selected according to the nature of distance data included in a line. If a small threshold is set for a line group including many noises, many lines will be included into different regions and thus the region growing will not appropriately be done.

On this account, in this embodiment, the threshold ($th_{rms}2$) is varied as given by the following equation (9) correspondingly to noises included in a line to enable an adaptive judgment depending upon the accuracy of line data:

$$th_{rms}2 = \max(th_{rms}3, d_{maha} \text{sigma}(l_2)) \quad (9)$$

where $th_{rms}3$ indicates a constant defining the lower limit of the threshold ($th_{rms}2$), $d_{maha}$ indicates a maharanobis distance, and sigma ( ) indicates a variance of the line. With data including many noises, the variance of a line sigma( ) is large, threshold ($th_{rms}2$) is also large, and a range of region growing is allowed.

Note here that sum of differences $E_{fit}$ between the line equation model as given in the aforementioned equation (2) and data points is used as the line variance sigma ( ) and the lower limit $th_{rms}3$ of the threshold is the same as the threshold $th_{rms}1$ of the tolerance for the line used in searching the seed region.

Also, once the plane parameters n and d are calculated, the root mean square residual rms of the plane equation can easily be calculated by the aforementioned equation (8) by updating the plane equation on the basis of the values of two moments determined during line fitting of a group of data points.

Also, the aforementioned selection of a seed region can be expressed as shown in FIG. 28. In FIG. 28, "overlap($l_j, l_k$)" is a function for outputting "true" when a position between end points in straight line vectors $l_j$ and $l_k$ included in each image row overlaps the straight line vectors in a position of intersecting the line vectors. Also, "fitplane($l_1, l_2, l_3$)" is a function for determining a solution of Am=B by the aforementioned equations (4) to (7), calculating the plane parameters n and d and fitting line vectors $l_1, l_2$ and $l_3$ to the plane by the terms A and b calculated by the equation (8).

"rms($l_1, l_2, l_3$)" is a function for calculating, using the equation (6), the value of root mean square residual rms of the plane equation as to all the three straight lines. Also, "removed($l_1, l_2, l_3$)" means removal of straight lines $l_1, l_2$ and $l_3$ selected as forming a seed region from lines [i], lines [i+1] $l_2$ and lines [i+2], respectively, which removal will prevent these straight lines from being used again for calculation.

Also, the region growing may be expressed as in FIG. 29. In FIG. 27, the terms A and b are a matrix and vector, respectively, included in the aforementioned equation (6-1). Also, "add(A, b, 1)" is a function for adding the moment of a straight line Line to A and b using the equation (8). "Solve(A, b)" is used to determine the value m which meets Am=b and calculate the plane parameters n and d on the basis of the equations (4) to (7). "select(open)" is a function for selecting one element arbitrarily from "open". Also, "index($l_1$)" is a function for returning the index of "$l_1$" in the image column or row. Also, neighbor(index)" is a function for returning an index adjacent to a given index, for example, {index−1, index+1}.

Also, in this embodiment, the region growing is done in step S3 in FIG. 19 to update the plane equation, and then the plane equation is recalculated (which is a post-processing) in step S4, as having previously been described. In this recalculation, a displacement, from the plane, of the distance data or lines estimated to be in a plane defined by the plane equation finally acquired through the aforementioned updating, for example, and the plane equation is updated again with exclusion of the distance data or lines more than a predetermined value off the plane, whereby the influence of noises can further be reduced.

Next, the operation in step S4 will be described in further detail. Here will be explained a technique for recalculation of the plane equation in two steps. First, when data points nearer to a plane adjacent to a plane in which the data points currently exist than the latter plane are detected at distance data points (pixels) at the boundary of each plane detected in step S3, the data points are included into the adjacent plane. Also, in case there can be detected data points not in any of plane but through which there passes a plane whose distance to the data points is smaller than a relatively large threshold such as 1.5 cm, the data points in question are included into that plane. These operations can be effected by searching data points near the boundary of each planar region. After completion of these operations, the plane equation is recalculated.

Next, in case the distance between each data point and the plane exceeds a relatively small threshold such as 0.75 cm at a location near the boundary of each region of a plane recalculated as above, such data points are discarded. Thereby, the planar region will be somewhat smaller but a more accurate plane can be determined. The deletion of distance data points and recalculation of a plane are repeatedly done, whereby an extremely accurate plane can be determined.

Figure 30C:
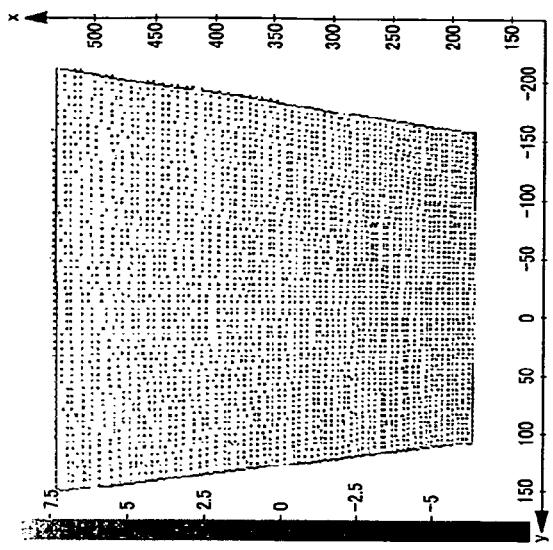
FIG. 30C shows a planar region determined by the region growing from the group of straight lines shown in FIG. 30B.
Figure 30B:
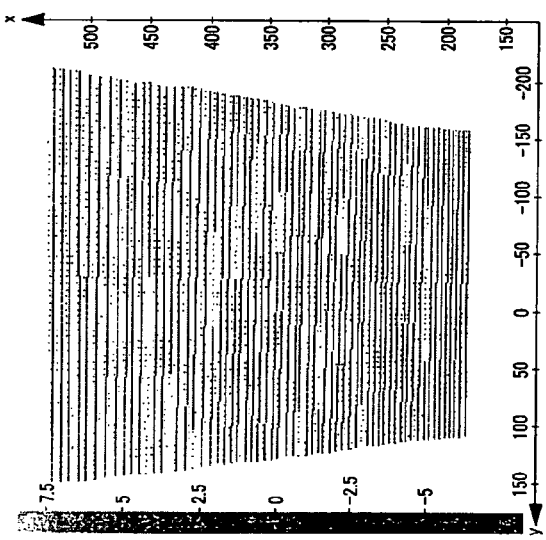
FIG. 30B shows three-dimensional distance data with the vertical axis taken as x, horizontal axis as y and the density of each data point taken as z, and straight lines extracted from a group of data points lying in one plane or line-directional pixel train by the line fitting process.
Figure 30A:
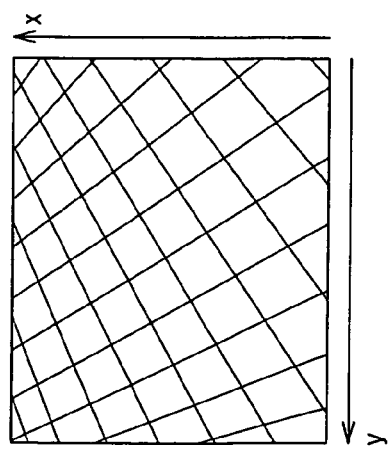
FIG. 30A is a schematic illustration of a floor surface viewed from the robot apparatus being in upright position.

Next, the result from each of the above operations will be described. FIG. 30A is a schematic illustration of a floor surface viewed from the robot apparatus being in upright position, and FIG. 30B shows three-dimensional distance data with the vertical axis taken as x, horizontal axis as y and the density of each data point taken as z, and straight lines detected from a group of data points lying in one plane or line-directional pixel train by the line fitting process. FIG. 30C shows a planar region determined by the region growing from the group of straight lines shown in FIG. 30B. As seen in these drawings, only one plane (floor surface) exists in the field of view of the robot apparatus, namely, all the floor surfaces are detected as the same plane.

FIG. 31 explains the difference in result of performance between the plane detection method according to the embodiment and conventional plane detection method when a step is placed on a flat surface. As shown in FIG. 31A, a step ST3 is placed on the floor F. FIG. 31B shows experimental conditions. In case the distance between a point of interest and straight line (line segment) exceeds max_d, the data point group is segmented. The column "Correct extraction (horizontal)" shows the number of times of succeed in plane detection by the line fitting in which a total of 10 times of line fitting is done for each line-directional data train, the column "Correct extraction (vertical)" shows whether the extraction has successfully be done for each column-directional data train. Also, the "Nos. 1 to 5" show the conditions for plane fitting by the conventional line fitting method in which the aforementioned zig-zag shape discrimination is not adopted, and the "No. 6" shows the conditions for the plane fitting adopted in this embodiment and adopting the zig-zag shape discrimination.

FIGS. 31C and 31D show the results of the plane detection by line fitting. FIG. 31C shows the result of the plane detection done according to the embodiment, and FIG. 31D shows the results of plane detection by the conventional line fitting (as comparative example). As seen in FIG. 31B, in case the plane detection is done by the conventional line fitting, if the threshold parameter max_d is increased in value (max_d=25 or 30) for the purpose of estimation, the rate of detection will be lower. If the threshold parameter max_d is decreased in value (max_d=10 or 15), the detection rate will be higher. Thus it will be understood that according to the present invention, however, the introduction of the zig-zag shape discrimination permits to provide excellent results of detection even if the threshold parameter is increased in value (max_d=30).

Figure 32B:
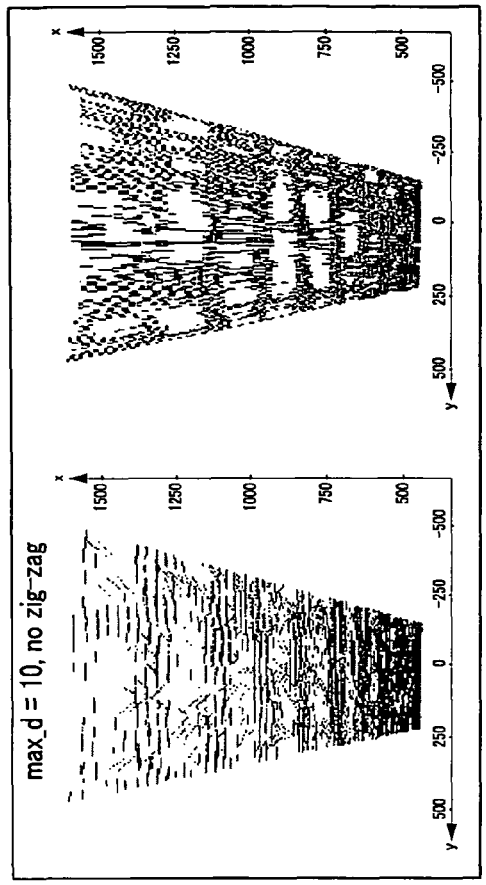
FIGS. 32B and 32C show lines extracted by the line fitting method according to this embodiment and by the conventional line fitting method, respectively, from the horizontal and vertical distance data point trains, respectively, included in the three-dimensional distance data acquired by taking a picture of the floor surface shown in FIG. 32A.
Figure 32C:
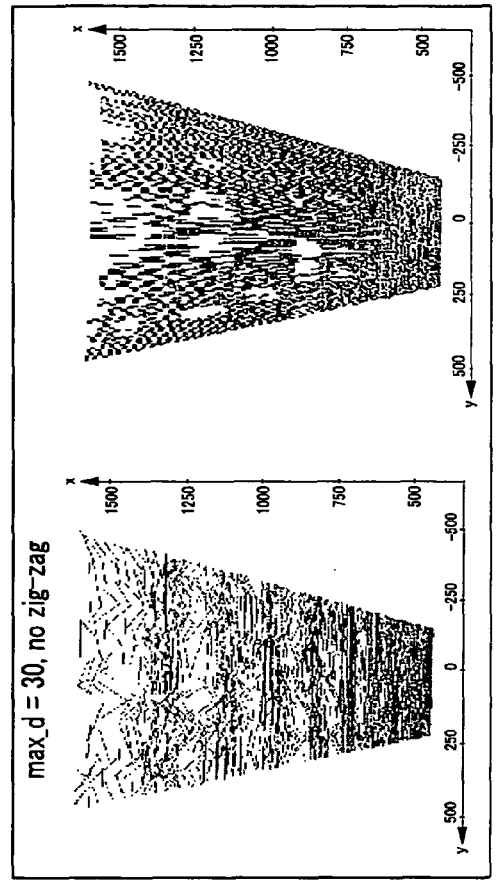
Figure 32A:
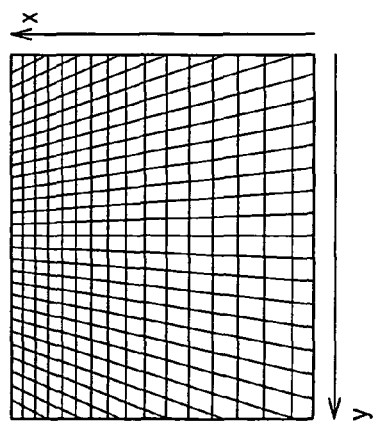
FIG. 32A schematically illustrates an image of a floor surface.
Figure 34A:
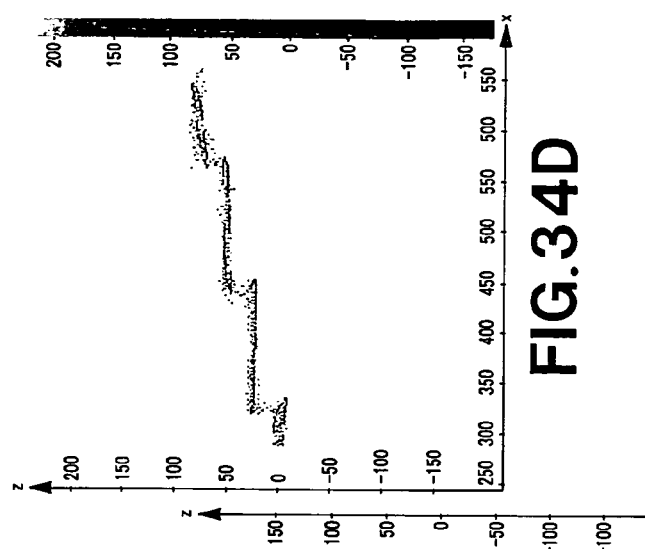
FIG. 34A schematically illustrates an image of other stairs.
Figure 34B:
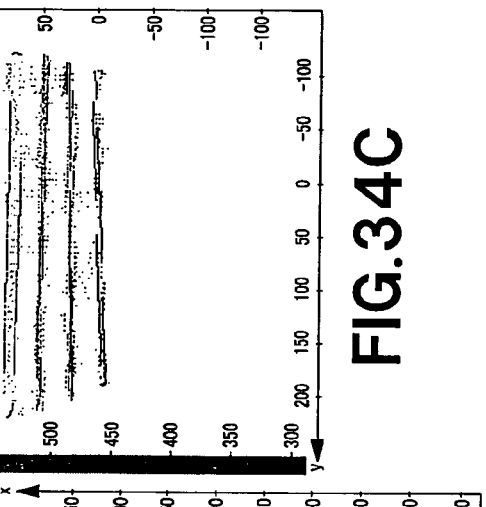
FIGS. 34B to 34D show examples of the plane detected from top, front and bottom on the basis of the three-dimensional distance data acquired from the image in FIG. 34A.
Figure 34C:
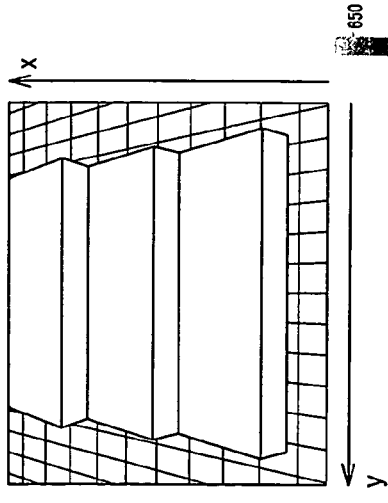
Figure 34D:
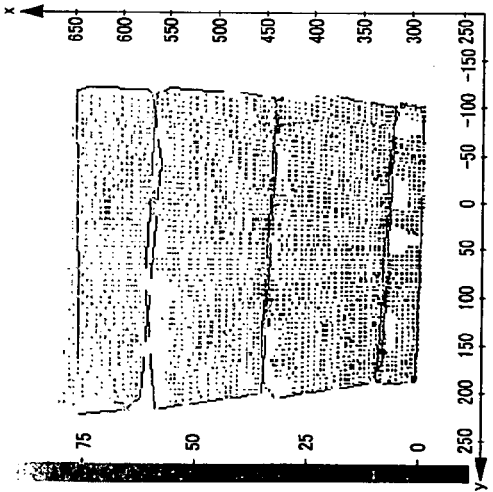

More particularly, as the threshold parameter max_d is set larger, the noise influence will be lower but the line fitting will be difficult. On the contrary, when the threshold parameter max_d is set smaller, the line fitting will be erroneous more frequently under the influence of noises. FIG. 32A schematically illustrates an image of a floor surface, and FIGS. 32B and 32C show lines fitted by the line fitting method adopted in this embodiment and by the conventional line fitting method, respectively, on the basis of horizontal and vertical distance data point trains, respectively, included in the three-dimensional distance data acquired by taking a picture of the floor surface shown in FIG. 32A. The left half of each of FIGS. 32B and 32C shows an example of the line fitted based on the line-directional pixel train (distance data train) and right half shows an example of the line fitted based on the line-directional pixel train (distance data train). As will be known from FIG. 32B, when the threshold parameter max_d is set smaller, the noise influence will be increased. Lines cannot well be detected from a far location where the noise influence is large. On the other hand, as seen in FIG. 32C, in case the zig-zag shape discrimination is added to the conventional line fitting, even if the threshold parameter max_d is set larger, lines can detected even from a far location where the influence of noises is large.

FIGS. 33 to 34 show acquisition of three-dimensional distance data from images of different stairs and plane detection based on the three-dimensional distance data. As shown in FIGS. 33 and 34, for example, all treads can be detected as planes in any case. It should be noted that a part of the floor can be detected as another plane as shown in FIG. 34B.

According this embodiment, for the plane detection by the line fitting method, a large threshold is initially set to segment a line. Then, the zig-zag shape discrimination is effected to segment a straight line having not any larger number of data points than the threshold but having a zig-zag shape taking the line as a line formed from a plurality of planes. Therefore, the plurality of planes can accurately be detected based on distance information or data including noises.

Since even a small step can be detected with a high accuracy as above, stairs or the like can be recognized in an environment in which the robot apparatus can move, for example, the robot apparatus, which is of a bipedal walking type, can climb the stairs on the basis of such results of detection.

Further, any irregular floor surface formed from a plurality of planes will not erroneously be recognized as a plane on which the robot apparatus can walk and the robot apparatus will be able to move more easily.

In the foregoing, the present invention has been described in detail concerning the preferred embodiment thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims. Also, any arbitrary one or more of the aforementioned line fitting, zig-zag shape discrimination, region growing, etc. may be implemented by a hardware or a computer program is to be executed by a CPU. In the operations are to be performed under the control of the computer program, the latter may be distributed in a recording medium or via a transmission medium such as the Internet or the like.

The invention claimed is:

1. A plane detection apparatus for detecting planes from three-dimensional distance data, the apparatus comprising:
   a line fitting means for forming at least a line from each group of distance data points estimated to be in one plane in a three-dimensional space; and
   a planar region growing means for extracting a plurality of lines estimated to be in one plane from a group of lines extracted by the line fitting means to calculate a plane from the plurality of lines,
   the line fitting means forming lines using a changeable threshold adapted to distribution of distance data points and noises included in the group of distance data points.

2. The apparatus according to claim 1, wherein the line fitting means extracts a group of distance data points estimated to be in one plane on the basis of the distance between the distance data points, and re-estimates, based on the distribution of the distance data points in the distance data point group, whether the distance data point group exists in one plane.

3. The apparatus according to claim 1, wherein the line fitting means extracts lines from a group of distance data points estimated to be in the one plane, takes, as a point of interest, a distance data point whose distance to the lines is largest in the group of distance data points, judges, when the distance is smaller than a predetermined threshold, whether the distance data points in the distance data point group are unevenly distributed, and segments the distance data point group by the point of interest when the distribution is uneven.

4. The apparatus according to claim 1, wherein the line fitting means extracts a first line from the group of distance data points estimated to lie in the one plane, takes a distance data point in the group, whose distance from the first line is longest, as a point of interest, extracts a second line from the distance data point group when the distance is smaller than a predetermined threshold, judges whether a larger number of distance data points than a predetermined number exist continuously at one side of the second line, and divides the distance data point group by the point of interest when a larger number of distance data points than the predetermined number exist continuously.

5. The apparatus according to claim 4, wherein the line fitting means segments the distance data point group when the standard deviation of the distance data point group from which the first line has been determined is larger than a predetermined threshold.

6. The apparatus according to claim 4, wherein the line fitting means generates the second line by the least-squares method from a group of distance data points estimated to be in the one plane.

7. The apparatus according to claim 1, wherein the planar region growing means selects more than one line estimated to be in one plane and calculates a reference plane, searches lines estimated to be in the plane in which the reference plane lies as grouping lines from the group of lines, updates the reference plane with the grouping lines, repeats the grouping of the region of the reference plane, and outputs the updated plane as an updated one.

8. The apparatus according to claim 7, further comprising a plane recalculating means for recalculating a plane from the group of distance data points except for ones whose distance from the updated plane is larger than a predetermined threshold, if any, existing in the distance data point group in the updated plane.

9. The apparatus according to claim 7, wherein the planar region growing means estimates, based on a difference between a lines-determined plane and reference plane, whether the lines lie coplanar with the reference plane.

10. The apparatus according to claim 1, wherein the line fitting means extracts lines on the basis of three-dimensional distance data measured by a distance measuring means which measures a distance on the basis of a parallax of two imaging means.

11. The apparatus according to claim 1, wherein the line fitting means extracts lines on the basis of three-dimensional distance data measured by a laser range finder.

12. A plane detection method of detecting planes from three-dimensional distance data, the method performed by a processor comprising the steps of:
forminq, by the processor, at least a line from each group of distance data points estimated to be in one plane in a three-dimensional space, using a changeable threshold adapted to distribution of distance data points and noises included in the group of distance data points; and
extracting, by the processor, a plurality of lines estimated to be in one plane from a group of lines extracted by the line fitting means to calculate a plane from the plurality of lines to grow a planar region.

13. The method according to claim 12, wherein in the line forminq step, there is extracted a group of distance data points estimated to be in one plane on the basis of the distance between the distance data points, and it is re-estimated, based on the distribution of the distance data points in the distance data point group, whether the distance data point group exists in one plane.

14. The method according to claim 13, wherein in the line forming step, there are extracted lines from a group of distance data points estimated to be in the one plane, takes, as a point of interest, a distance data point whose distance to the lines is largest in the group of distance data points, it is judged, when the distance is smaller than a predetermined threshold, whether the distance data points in the distance data point group are unevenly distributed, and the distance data point group is segmented by the point of interest when the distribution is uneven.

15. The method according to claim 13, wherein in the line forming step, there is extracted a first line from the group of distance data points estimated to lie in the one plane, a distance data point in the group, whose distance from the first line is longest, is taken as a point of interest, there is extracted a second line from the distance data point group when the distance is smaller than a predetermined threshold, it is judged whether a larger number of distance data points than a predetermined number exist continuously at one side of the second line, and the distance data point group is segmented by the point of interest when the larger number of distance data points than the predetermined number exist continuously.

16. The method according to claim 12, wherein in the planar region growing step, there are selected more than one line estimated to be in one plane and a reference plane is calculated, there are searched lines estimated to be in the plane in which the reference plane lies as grouping lines from the group of lines, the reference plane with the grouping lines is updated and the grouping of the region of the reference plane is repeated, and the updated plane is outputted as an updated one.

17. The method according to claim 16, further comprising a plane recalculating step of recalculating, by the processor, a plane from the group of distance data points except for ones whose distance from the updated plane is larger than a predetermined threshold, if any, existing in the distance data point group in the updated plane.

18. The method according to claim 16, wherein in the planar region growing step, it is estimated, based on a difference between a lines-determined plane and reference plane, whether the lines lie coplanar with the reference plane.

19. An autonomous locomotion robot apparatus, comprising:
a distance measuring means for acquiring three-dimensional distance data;
a plane detection apparatus for detecting a plane from the three-dimensional distance data; and
a motion controlling means for controlling the motion of the apparatus on the basis of the result of plane detection by the plane detection apparatus,
the plane detection apparatus including:
a line fitting means for forming at least a line from each group of distance data points estimated to be in one plane in a three-dimensional space; and
a planar region growing means for extracting a plurality of lines estimated to be in one plane from a group of lines extracted by the line fitting means to calculate a plane from the plurality of lines,
the line fitting means forming lines using a changeable threshold adapted to distribution of distance data points and noises included in the group of distance data points.

20. The apparatus according to claim 19, further comprising a texture imparting means for imparting a texture to an object.

21. The apparatus according to claim 20, wherein the texture imparting means projects a texture to the object when acquiring the three-dimensional distance data.

* * * * *